(12) United States Patent
Laramie et al.

(10) Patent No.: US 10,553,893 B2
(45) Date of Patent: Feb. 4, 2020

(54) ELECTRODE PROTECTION USING A COMPOSITE COMPRISING AN ELECTROLYTE-INHIBITING ION CONDUCTOR

(71) Applicant: Sion Power Corporation, Tucson, AZ (US)

(72) Inventors: Michael G. Laramie, Tucson, AZ (US); Yuriy V. Mikhaylik, Tucson, AZ (US); Tracy Earl Kelley, Tucson, AZ (US); David Child, Tucson, AZ (US); Chariclea Scordilis-Kelley, Tucson, AZ (US); Veronika G. Viner, Tucson, AZ (US); Bala Sankaran, Shelby Township, MI (US); Johan ter Maat, Mannheim (DE); Ruediger Schmidt, Paderborn (DE); Holger Schneider, Ludwigshafen (DE); Klaus Leitner, Ludwigshafen (DE); Joern Kulisch, Eppelheim (DE); Marina Safont-Sempere, Ludwigshafen (DE)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 15/459,152

(22) Filed: Mar. 15, 2017

(65) Prior Publication Data

US 2017/0250390 A1 Aug. 31, 2017

Related U.S. Application Data

(63) Continuation of application No. 14/624,641, filed on Feb. 18, 2015, now Pat. No. 9,653,750.

(Continued)

(51) Int. Cl.
*H01M 2/14* (2006.01)
*H01M 10/052* (2010.01)
(Continued)

(52) U.S. Cl.
CPC ............. *H01M 10/052* (2013.01); *C08J 7/00* (2013.01); *C08J 7/123* (2013.01); *H01M 2/166* (2013.01);
(Continued)

(58) Field of Classification Search
CPC ............. H01M 10/052; H01M 2/1646; H01M 2/1673; H01M 2/1686; H01M 2/166;
(Continued)

(56) References Cited

U.S. PATENT DOCUMENTS 3,080,350 A 3/1963 Kiyokazu et al.
4,664,991 A 5/1987 Perichaud et al.
(Continued)

FOREIGN PATENT DOCUMENTS

DE 199 16 043 A1 10/2000
JP H10-172531 A 6/1998
(Continued)

OTHER PUBLICATIONS

U.S. Appl. No. 14/323,269, filed Jul. 3, 2014, Laramie et al.
(Continued)

*Primary Examiner* — Cynthia K Walls
(74) *Attorney, Agent, or Firm* — Wolf, Greenfield & Sacks, P.C.

(57) ABSTRACT

Composite structures including an ion-conducting material and a polymeric material (e.g., a separator) to protect electrodes are generally described. The ion-conducting material may be in the form of a layer that is bonded to a polymeric separator. The ion-conducting material may com-
(Continued)

prise a lithium oxysulfide having a lithium-ion conductivity of at least at least $10^{-6}$ S/cm.

21 Claims, 5 Drawing Sheets

Related U.S. Application Data

(60) Provisional application No. 61/941,734, filed on Feb. 19, 2014, provisional application No. 61/941,546, filed on Feb. 19, 2014.

(51) Int. Cl.
*H01M 10/0562* (2010.01)
*H01M 2/16* (2006.01)
*C08J 7/00* (2006.01)
*C08J 7/12* (2006.01)
*H01M 6/18* (2006.01)

(52) U.S. Cl.
CPC ....... *H01M 2/1646* (2013.01); *H01M 2/1653* (2013.01); *H01M 2/1673* (2013.01); *H01M 2/1686* (2013.01); *H01M 10/0562* (2013.01); *C08J 2323/12* (2013.01); *H01M 6/18* (2013.01)

(58) Field of Classification Search
CPC .. H01M 2/1653; H01M 10/0562; H01M 6/18; C08J 7/123; C08J 7/00; C08J 2323/12
See application file for complete search history.

(56) References Cited

U.S. PATENT DOCUMENTS

| | | |
|---|---|---|
| 4,739,018 A | 4/1988 | Armand et al. |
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,682,210 A | 10/1997 | Weirich |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,010,798 A | 1/2000 | Hammerschmidt et al. |
| 6,025,094 A | 2/2000 | Visco et al. |
| 6,117,590 A | 9/2000 | Skotheim et al. |
| 6,120,930 A | 9/2000 | Rouillard et al. |
| 6,134,773 A | 10/2000 | Kejha |
| 6,153,337 A | 11/2000 | Carlson et al. |
| 6,171,460 B1 | 1/2001 | Bill |
| 6,201,100 B1 | 3/2001 | Gorkovenko et al. |
| 6,214,061 B1 | 4/2001 | Visco et al. |
| 6,248,469 B1 | 6/2001 | Formato et al. |
| 6,306,545 B1 | 10/2001 | Carlson et al. |
| 6,402,795 B1 | 6/2002 | Chu et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,488,721 B1 | 12/2002 | Carlson |
| 6,544,688 B1 | 4/2003 | Cheng |
| 6,737,197 B2 | 5/2004 | Chu et al. |
| 6,991,662 B2 | 1/2006 | Visco et al. |
| 7,069,836 B1 | 7/2006 | Palicka et al. |
| 7,070,632 B1 | 7/2006 | Visco et al. |
| 7,081,142 B1 | 7/2006 | Carlson |
| 7,160,603 B2 | 1/2007 | Carlson |
| 7,175,937 B2 * | 2/2007 | Cho ............... H01M 2/145 427/126.1 |
| 7,247,408 B2 | 7/2007 | Skotheim et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,139,343 B2 | 3/2012 | Gibson et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,329,343 B2 | 12/2012 | Yamaguchi et al. |
| 8,334,075 B2 | 12/2012 | Visco et al. |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont Sempere et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,397,342 B2 | 7/2016 | Skotheim et al. |
| 9,548,492 B2 | 1/2017 | Affinito et al. |
| 9,653,735 B2 | 5/2017 | Skotheim et al. |
| 9,653,750 B2 | 5/2017 | Laramie et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,853,305 B2 | 12/2017 | Yamakawa et al. |
| 2001/0036573 A1 | 11/2001 | Jen et al. |
| 2002/0012846 A1 | 1/2002 | Skotheim et al. |
| 2002/0144899 A1 | 10/2002 | Arcella et al. |
| 2004/0142244 A1 | 7/2004 | Visco et al. |
| 2004/0209159 A1 | 10/2004 | Lee et al. |
| 2004/0253510 A1 | 12/2004 | Jonghe et al. |
| 2005/0008938 A1 | 1/2005 | Cho et al. |
| 2005/0095504 A1 * | 5/2005 | Kim ............... H01M 2/1673 429/246 |
| 2006/0115579 A1 | 6/2006 | Mukherjee et al. |
| 2006/0121345 A1 | 6/2006 | Yasuda et al. |
| 2006/0130320 A1 | 6/2006 | Murosawa et al. |
| 2006/0147801 A1 | 7/2006 | Yasuda et al. |
| 2006/0147802 A1 | 7/2006 | Yasuda et al. |
| 2006/0177732 A1 | 8/2006 | Visco et al. |
| 2006/0180269 A1 | 8/2006 | Karatsu et al. |
| 2006/0222954 A1 | 10/2006 | Skotheim et al. |
| 2006/0238203 A1 | 10/2006 | Kelley et al. |
| 2007/0072036 A1 | 3/2007 | Berta et al. |
| 2007/0106057 A1 | 5/2007 | Watanabe et al. |
| 2007/0122716 A1 * | 5/2007 | Seo ............... H01M 2/1646 429/251 |
| 2007/0166617 A1 | 7/2007 | Gozdz et al. |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0020923 A1 | 1/2008 | Debe et al. |
| 2008/0057397 A1 | 3/2008 | Skotheim et al. |
| 2008/0187663 A1 | 8/2008 | Affinito |
| 2008/0190841 A1 | 8/2008 | Pascaly et al. |
| 2008/0213672 A1 | 9/2008 | Skotheim et al. |
| 2008/0318128 A1 | 12/2008 | Simoneau et al. |
| 2009/0035646 A1 | 2/2009 | Mikhaylik et al. |
| 2009/0061288 A1 | 3/2009 | Gordon et al. |
| 2009/0130547 A1 | 5/2009 | Lee et al. |
| 2009/0155676 A1 | 6/2009 | Zhamu et al. |

(56) References Cited

U.S. PATENT DOCUMENTS

| | | |
|---|---|---|
| 2009/0197158 A1 | 8/2009 | Ogawa et al. |
| 2009/0200986 A1 | 8/2009 | Kopera |
| 2009/0226809 A1 | 9/2009 | Vu et al. |
| 2009/0280410 A1 | 11/2009 | Zaguib et al. |
| 2009/0291353 A1 | 11/2009 | Affinito et al. |
| 2009/0305141 A1 | 12/2009 | Lee et al. |
| 2010/0035128 A1 | 2/2010 | Scordilis-Kelley et al. |
| 2010/0112454 A1 | 5/2010 | Visco et al. |
| 2010/0129699 A1 | 5/2010 | Mikhaylik et al. |
| 2010/0227228 A1 | 9/2010 | Yamazaki et al. |
| 2010/0233547 A1 | 9/2010 | Baba et al. |
| 2010/0239914 A1 | 9/2010 | Mikhaylik et al. |
| 2010/0291442 A1 | 11/2010 | Wang et al. |
| 2010/0327811 A1 | 12/2010 | Affinito et al. |
| 2011/0033784 A1 | 2/2011 | Ljungcrantz et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1 | 7/2011 | Affinito et al. |
| 2011/0206992 A1 | 8/2011 | Campbell et al. |
| 2011/0244336 A1 | 10/2011 | Schmitz et al. |
| 2011/0311856 A1 | 12/2011 | Matusi et al. |
| 2012/0043940 A1 | 2/2012 | Affinito et al. |
| 2012/0048729 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0214043 A1 | 8/2012 | Olschimke et al. |
| 2012/0219842 A1 | 8/2012 | Visco et al. |
| 2012/0270112 A1 | 10/2012 | Visco et al. |
| 2012/0276449 A1 | 11/2012 | Skotheim et al. |
| 2012/0276459 A1 | 11/2012 | Im et al. |
| 2012/0301774 A1 | 11/2012 | Jiang et al. |
| 2012/0305390 A1 | 12/2012 | Fredenberg et al. |
| 2013/0004852 A1 | 1/2013 | Visco et al. |
| 2013/0017441 A1 | 1/2013 | Affinito et al. |
| 2013/0059192 A1 | 3/2013 | Kajita et al. |
| 2013/0095380 A1 | 4/2013 | Affinito et al. |
| 2013/0143096 A1 | 6/2013 | Affinito et al. |
| 2013/0149587 A1 | 6/2013 | Yu et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0266842 A1 | 10/2013 | Woehrle et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont Sempere et al. |
| 2014/0127419 A1 | 5/2014 | Fleischmann et al. |
| 2014/0127577 A1 | 5/2014 | Fleischmann et al. |
| 2014/0205912 A1 | 7/2014 | Skotheim et al. |
| 2014/0272565 A1 | 9/2014 | Gronwald et al. |
| 2014/0272594 A1 | 9/2014 | Safont Sempere et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2017/0141402 A1 | 5/2017 | Affinito et al. |
| 2017/0352863 A1 | 12/2017 | Mikhaylik et al. |
| 2017/0373321 A1 | 12/2017 | Skotheim et al. |

FOREIGN PATENT DOCUMENTS

| | | |
|---|---|---|
| JP | 2001-085065 A | 3/2001 |
| JP | 2008-103259 A | 5/2008 |
| JP | 2008-152985 A | 7/2008 |
| JP | 2009-516325 A | 4/2009 |
| JP | 2009-544121 A | 12/2009 |
| JP | 2010-050076 A | 3/2010 |
| JP | 2010-073339 A | 4/2010 |
| JP | 2010-538424 A | 12/2010 |
| JP | 2011-168935 A | 9/2011 |
| JP | 2011-253673 A | 12/2011 |
| JP | 2012-022835 A | 2/2012 |
| JP | 2014-086174 A | 5/2014 |
| KR | 10-2010-0017057 A | 2/2010 |
| WO | WO 03/99556 A1 | 12/2003 |
| WO | WO 2004/036669 A2 | 4/2004 |
| WO | WO 2007/075867 A2 | 7/2007 |
| WO | WO 2007/111895 A2 | 10/2007 |
| WO | WO 2009/029270 A1 | 3/2009 |
| WO | WO 2009/043011 A1 | 4/2009 |
| WO | WO 2011/023110 A1 | 3/2011 |
| WO | WO 2011/147723 A1 | 12/2011 |
| WO | WO 2012/025543 A1 | 3/2012 |
| WO | WO 2012/156903 A1 | 11/2012 |
| WO | WO 2013/072224 A1 | 5/2013 |
| WO | WO 2014/032948 A1 | 3/2014 |

OTHER PUBLICATIONS

U.S. Appl. No. 14/552,608, filed Nov. 25, 2014, Laramie et al.
[No Author Listed], Standard Test Methods for Measuring Adhesion by Tape Test. ASTM Standard D 3359-02. ASTM International, West Conshohocken, PA, 2002. 4 pages.
International Search Report and Written Opinion for PCT/US2014/017093 dated Nov. 18, 2014.
Extended European Search Report for EP 15155510.9 dated Jul. 7, 2015.
International Search Report and Written Opinion for PCT/US2015/016281 dated Jun. 18, 2015.
Addae-Mensan et al. Poly(vinyl alcohol) as a structure release layer for the microfabrication of polymer composite structures. J Micromech Microeng. 2007; 17:N41-N46.
Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.
Kim et al., Surface-modified membrane as a separator for lithium-ion polymer battery. Energies. Apr. 23, 2010; 3:866-885.
Nakamatsu et al., Nanoimprint and Lift-Off Process Using Poly(vinyl alcohol). Jap J Appl Phys. 2005; 44(11):8186-8188.
Extended European Search Report for EP 14882852.8 dated Aug. 23, 2017.
U.S. Appl. No. 12/862,513, filed Aug. 24, 2010, Affinito et al.
U.S. Appl. No. 14/088,750, filed Nov. 25, 2013, Affinito et al.
U.S. Appl. No. 12/862,528, filed Aug. 24, 2010, Affinito et al.
U.S. Appl. No. 14/209,274, filed Mar. 13, 2014, Mikhaylik et al.
U.S. Appl. No. 14/209,396, filed Mar. 13, 2014, Gronwald et al.
U.S. Appl. No. 14/184,037, filed Feb. 19, 2014, Laramie et al.
PCT/US2014/017093, Nov. 18, 2014, International Search Report and Written Opinion.
EP15155510.9, Jul. 7, 2015, Extended European Search Report.
PCT/US2015/016281, Jun. 18, 2015, International Search Report and Written Opinion.
U.S. Appl. No. 15/635,443, filed Jun. 28, 2017, Mikhaylik et al.

* cited by examiner

ELECTRODE PROTECTION USING A COMPOSITE COMPRISING AN ELECTROLYTE-INHIBITING ION CONDUCTOR

RELATED APPLICATIONS

This application is a continuation of U.S. application Ser. No. 14/624,641, filed Feb. 18, 2015, which claims priority under 35 U.S.C. § 119(e) to U.S. Provisional Application Ser. No. 61/941,734, filed Feb. 19, 2014, and U.S. Provisional Application Ser. No. 61/941,546, filed Feb. 19, 2014, which are incorporated herein by reference in their entirety for all purposes.

TECHNICAL FIELD

Composite structures that include an ion-conducting material and a polymeric material (e.g., a separator) to protect electrodes are generally described.

BACKGROUND

Rechargeable and primary electrochemical cells oftentimes include one or more protective layers to protect the electroactive surface. Depending upon the specific protective layer(s), the protective layer(s) isolates the underlying electroactive surface from interactions with the electrolyte and/or other components within the electrochemical cell. In order to provide appropriate protection of the underlying electrode, it is desirable that the protective layer(s) continuously cover the underlying electrode and exhibit a minimal number of defects. Although techniques for forming protective layer(s) exist, methods that would allow formation of protective layer(s) that would improve the performance of an electrochemical cell would be beneficial.

SUMMARY

Composite structures that include an ion-conducting material and a polymeric material (e.g., a separator) to protect electrodes are generally described. Associated systems and methods are generally described. The ion-conducting material can inhibit interaction between the protected electrode and an electrolyte.

In one set of embodiments, electrochemical cells are described. An electrochemical cell may include, for example, a first electrode comprising lithium as an electroactive material, a second electrode, and a composite positioned between the first and second electrodes. The composite comprises a separator comprising pores having an average pore size, wherein the separator has a bulk electronic resistivity of at least about $10^4$ Ohm-meters, and an ion conductor layer bonded to the separator. The ion conductor layer has a lithium-ion conductivity of at least at least $10^{-6}$ S/cm. The ion conductor layer comprises a lithium oxysulfide having an oxide content between 0.1-20 wt % and/or wherein the ion conductor layer comprises a lithium oxysulfide having an atomic ratio of oxygen atoms to sulfur atoms (O:S) in the range of from 0.001:1 to 1.5:1.

In one set of embodiments, electrochemical cells are described. An electrochemical cell may include, for example, a first electrode comprising lithium as an electroactive material, a second electrode, and a composite positioned between the first and second electrodes. The composite comprises a separator comprising pores having an average pore size, wherein the separator has a bulk electronic resistivity of at least about $10^4$ Ohm-meters, and an ion conductor layer bonded to the separator. The ion conductor layer has a lithium-ion conductivity of at least at least $10^{-6}$ S/cm. The ion conductor layer comprises a lithium oxysulfide having an oxide content between 0.1-20 wt % and/or wherein the ion conductor layer comprises a lithium oxysulfide having an atomic ratio of sulfur atoms to oxygen atoms (S:O) in the range of from 0.5:1 to 1000:1.

An electrochemical cell may include, for example, a first electrode comprising lithium as an electroactive material, a second electrode, and a composite positioned between the first and second electrodes. The composite comprises a separator comprising pores having an average pore size, wherein the separator has a bulk electronic resistivity of at least about $10^4$ Ohm-meters, and an ion conductor layer bonded to the separator. The ion conductor layer has a lithium-ion conductivity of at least at least $10^{-6}$ S/cm. The ion conductor layer comprises an atomic ratio of sulfur: oxygen of between 1:1 to 100:1.

An electrochemical cell may include, for example, a first electrode comprising lithium as an electroactive material, a second electrode, and a composite positioned between the first and second electrodes. The composite comprises a separator comprising pores having an average pore size, wherein the separator has a bulk electronic resistivity of at least about $10^4$ Ohm-meters, and an ion conductor layer bonded to the separator. The ion conductor layer has a lithium-ion conductivity of at least at least $10^{-6}$ S/cm. The ion conductor layer comprises a lithium oxysulfide having an atomic ratio of oxygen atoms to sulfur atoms (O:S) in the range of from 0.001:1 to 1.5:1, e.g., in the range of from 0.01:1 to 0.25:1.

An electrochemical cell (preferably an electrochemical cell as described above), wherein the electrochemical cell is a lithium-sulfur cell, may comprise, for example, a first electrode comprising lithium, a second electrode comprising sulfur, a separator arranged between said first electrode and said second electrode, and a solid ion conductor contacting and/or bonded to the separator, wherein said solid ion conductor comprises a lithium-ion conducting oxysulfide.

In some embodiments involving the electrochemical cells described above and herein, the ion conductor layer comprising the lithium oxysulfide is a part of a multi-layered structure comprising more than one ion conductor layers. In some instances, at least two layers of the multi-layered structure are formed of different materials. In other instances, at least two layers of the multi-layered structure are formed of the same material. The ion conductor layer comprising the lithium oxysulfide may be in direct contact with each of the first electrode and the separator.

In some embodiments involving the electrochemical cells described above and herein, the separator has a thickness between 5 microns and 40 microns. The separator may have a bulk electronic resistivity of at least $10^{10}$ Ohm meters, e.g., between $10^{10}$ Ohm meters and $10^{15}$ Ohm meters.

In some embodiments involving the electrochemical cells described above and herein, the separator is a solid, polymeric separator. In some cases, the separator is a solid comprising a mixture of a polymeric binder and filler comprising a ceramic or a glassy/ceramic material. In certain embodiments, the separator comprises one or more of poly (n-pentene-2), polypropylene, polytetrafluoroethylene, a polyamide (e.g., polyamide (Nylon), poly(ϵ-caprolactam) (Nylon 6), poly(hexamethylene adipamide) (Nylon 66)), a polyimide (e.g., polynitrile, and poly(pyromellitimide-1,4-diphenyl ether) (Kapton®) (NOMEX®) (KEVLAR®)), polyether ether ketone (PEEK), and combinations thereof.

In some embodiments involving the electrochemical cells described above and herein, the composite is formed by subjecting a surface of the separator to a plasma prior to depositing the ion conductor layer on the surface of the separator.

In some embodiments involving the electrochemical cells described above and herein, the lithium oxysulfide has a formula of $x(yLi_2S+zLi_2O)+MS_2$ (where M is Si, Ge, or Sn), where $y+z=1$, and where x may range from 0.5-3.

In some embodiments involving the electrochemical cells described above and herein, the ion conductor layer comprises a glass forming additive ranging from 0 wt % to 30 wt % of the inorganic ion conductor material.

In some embodiments involving the electrochemical cells described above and herein, the ion conductor layer comprises one or more lithium salts. A lithium salt may include, for example, LiI, LiBr, LiCl, $Li_2CO_3$, and/or $Li_2SO_4$. The one or more lithium salts is added to the inorganic ion conductor material at a range of, e.g., 0 to 50 mol %. In some embodiments involving the electrochemical cells described above and herein, the separator has an average pore size of less than or equal to 5 microns, less than or equal to 1 micron, less than or equal to 0.5 microns, between 0.05-5 microns, or between 0.1-0.3 microns.

In some embodiments involving the electrochemical cells described above and herein, the ion conductor layer has a thickness of less than or equal to 2 microns, less than or equal to 1.5 microns, less than or equal to 1 micron, less than or equal to 800 nm, less than or equal to 600 nm, or between 400 nm and 600 nm.

In some embodiments involving the electrochemical cells described above and herein, the composite has a lithium ion conductivity of at least $10^{-5}$ S/cm, at least $10^{-4}$ S/cm, or at least $10^{-3}$ S/cm at 25 degrees Celsius.

In some embodiments involving the electrochemical cells described above and herein, a ratio of a thickness of the ion conductor layer to the average pore size of the separator is at least 1.1:1, at least 2:1, at least 3:1 or at least 5:1.

In some embodiments involving the electrochemical cells described above and herein, a strength of adhesion between the separator and the ion conductor layer is at least 350 N/m or at least 500 N/m. In some instances, a strength of adhesion between the separator and the ion conductor layer passes the tape test according to the standard ASTM D3359-02.

In some embodiments involving the electrochemical cells described above and herein, the first electroactive material comprises lithium; e.g., the first electroactive material may comprise lithium metal and/or a lithium alloy. In some cases, the second electrode comprises sulfur as a second electroactive material.

In some embodiments involving the electrochemical cells described above and herein, the ion conductor is deposited onto the separator by electron beam evaporation or by a sputtering process.

In one set of embodiments, an electrochemical cell described herein is a lithium-sulfur cell comprising a first electrode comprising lithium, a second electrode comprising sulfur, a separator arranged between said first electrode and said second electrode, and a solid ion conductor contacting and/or bonded to the separator, wherein said solid ion conductor comprises a lithium-ion conducting oxysulfide.

In some embodiments involving the electrochemical cells described above and herein, said solid ion conductor comprises a lithium oxysulfide.

In some embodiments involving the electrochemical cells described above and herein, said solid ion conductor comprises a lithium oxysulfide having an atomic ratio of oxygen atoms to sulfur atoms (O:S) in the range of from 0.001:1 to 1.5:1, e.g., in the range of from 0.01:1 to 0.25:1.

In some embodiments involving the electrochemical cells described above and herein, said solid ion conductor is in the form of a layer having a thickness in the range of from 1 nm to 7 microns.

In some embodiments involving the electrochemical cells described above and herein, the separator is ionically conductive, the average ionic conductivity of the separator being preferably at least $10^{-7}$ S/cm at 25 degrees Celsius.

In some embodiments involving the electrochemical cells described above and herein, said separator and said solid ion conductor contacting the separator constitute a composite, the composite preferably having a thickness of 5 microns to 40 microns. The composite may be, in some embodiments, a free-standing structure.

In some embodiments involving the electrochemical cells described above and herein, the strength of adhesion between said separator and said solid ion conductor contacting the separator is at least 350 N/m.

In some embodiments involving the electrochemical cells described above and herein, said solid ion conductor is placed against one of said first and second electrodes. The solid ion conductor may be arranged to inhibit interaction of an electrolyte present in the electrochemical cell with the electrode against which it is placed.

In some embodiments involving the electrochemical cells described above and herein, the solid ion conductor comprises an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments involving the electrochemical cells described above and herein, the present invention relates to the use of a composite capable of being arranged between a first electrode and a second electrode, the composite being constituted of a separator, and a solid ion conductor contacting and/or bonded to the separator, wherein said solid ion conductor comprises a lithium-ion conducting oxysulfide, for separating a first electrode and a second electrode of an electrochemical cell, e.g., in a lithium sulfur cell. The solid ion conductor may be arranged for inhibiting interaction of an electrolyte present in an electrochemical cell with one of said electrodes of said electrochemical cell.

In some embodiments involving the electrochemical cells described above and herein, the composite is constituted of a separator and a solid ion conductor contacting and/or being bond to the separator, wherein said solid ion conductor comprises a lithium-ion conducting oxysulfide.

In some embodiments involving the electrochemical cells described above and herein, the present invention further relates to a process of making an electrochemical cell, comprising the following steps: making or providing a separator, contacting and/or bonding to the separator a solid ion conductor, providing further building elements of the electrochemical cell, and assembling the electrochemical cell.

In some embodiments involving the electrochemical cells described above and herein, contacting and/or bonding to the separator a solid ion conductor is achieved by depositing ion conductor material onto the surface of the separator. In some embodiments involving the electrochemical cells described above and herein, the intermediate product obtained by contacting and/or bonding to the separator a solid ion conductor is a composite being a free-standing structure.

Specific features of aspects of the embodiments as defined above are illustrated or discussed herein below in more detail.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
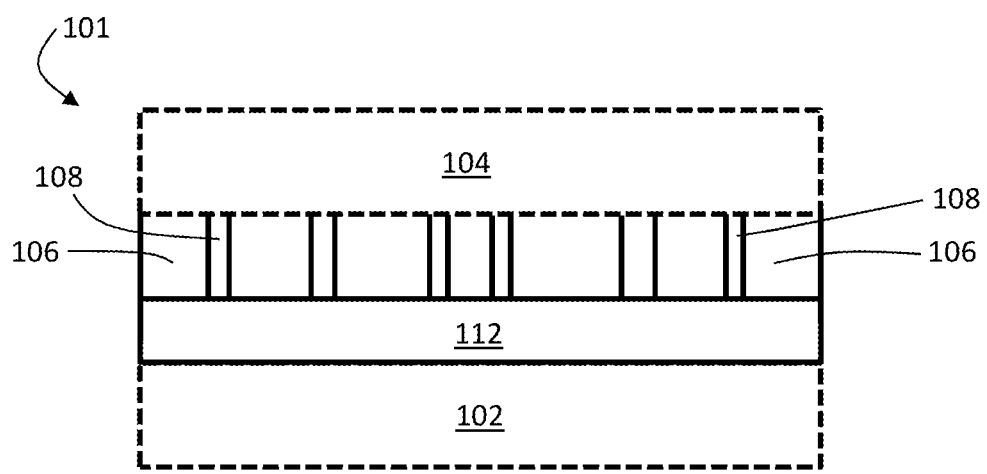
FIG. 1 is an exemplary schematic illustrations of electrochemical cells including a composite structure comprising an ion conductor layer and a separator layer, according to one set of embodiments.

Composite structures including an ion-conducting material and a polymeric material (e.g., a separator) to protect electrodes are generally described. The ion-conducting material may be in the form of a layer that is bonded to a polymeric separator. The ion-conducting material may comprise a lithium oxysulfide having a lithium-ion conductivity of at least at least $10^{-6}$ S/cm.

Layers of ceramic or other inorganic protective materials (e.g., glasses, glassy-ceramics) have been used to protect electrodes (e.g., lithium anodes) from adverse interaction with electrolyte material during operation of electrochemical cells. For example, protected lithium anode (PLA) structures have been employed comprising alternating continuous layers of ionically conductive ceramic and ionically conductive polymer. In certain cases, such protective electrode structures can be ineffective. For example, the brittleness of the ceramic, defects in the ceramic, and/or the swelling exhibited by the polymer upon exposure to the electrolyte can cause the protective electrode structure to crack or otherwise fail. The cascade failure of these layers can stem from the initial defects in the ceramic, which may be present from handling and/or from processing. This in turn allows the electrolyte to seep in and swell the polymer layer. The swelling of this layer can break the ceramic layers below and the electrolyte penetrates further to swell more polymer layers. This can eventually destroy all the protected layers, which can lead to failure of the electrochemical cell.

One way to address the problems discussed above is to develop materials and/or structures that do not substantially swell or break. This can be challenging, however. For example, many known polymers, which are ionically conductive, swell considerably in various electrochemical cell electrolytes. Also, it can be difficult to process ceramic materials such that they do not contain defects, and handling of such materials without introducing defects (e.g., cracks) is difficult. The ceramic material should also have sufficient ion conductivity to not inhibit ion conduction across the protective layer(s).

One approach described herein that can be used to address the issues outlined above with respect to ineffective electrode protective structures involves a structure that allows the use of a flexible, low-swelling polymer, which may be in the form of a separator, in combination with one or more ion conductor (e.g., a ceramic) layers that inhibits electrolyte interaction with the electrode. At least one of the ion conductor layer(s) may comprise a lithium oxysulfide material which provides sufficient ion conduction across the composite, as described in more detail herein.

The separator can act as a smooth substrate to which a smooth, thin ion conductor layer can be deposited. Prior to deposition of the ion conductor layer, the surface of the separator may be treated to enhance its surface energy. The increased surface energy of the separator can allow improved adhesion (e.g., bonding) between the ion conductor layer and the separator compared to when the surface of the separator is not treated, as described below. As a result of increased adhesion between the layers, the likelihood of delamination of the layers can be reduced, and the mechanical stability of the ion conductor layer can be improved during cycling of the cell. Additionally, since both the separator and the ion conductor layer can be included in an electrochemical cell, the ion conductor layer does not need to be released from a substrate. The avoidance of releasing the ion conductor layer may, in some cases, improve the mechanical integrity of the ion conductor layer. In certain embodiments, the resulting ion conductor layer-separator composite can enhance the ion conductor layer's ability to withstand the mechanical stresses encountered when it is placed in a pressurized cell against a rough cathode.

Additionally, in certain structures involving the use of a flexible separator material, the structure can inhibit (and/or prevent) mechanical failure of other adverse mechanical impact, such as plastic deformation, when changes in dimension are introduced to the structure, e.g., via swelling. The separator material may or may not be ionically conductive, which can allow for the use of a wide variety of separator materials (e.g., polymers that do or do not swell upon exposure to electrolyte). By adopting designs with such spatial orientations of the ion conductor and the separator, one can remove constraints on the materials that are used, which can allow for the use of already existing materials. Other advantages are described in more detail below.

FIG. 1 is an exemplary cross-sectional schematic illustration of an electrochemical cell comprising an ion conductor and a separator in the form of a composite structure, according to one set of embodiments. In FIG. 1, electrochemical cell 101 comprises first electrode 102 and second electrode 104. First electrode 102 (and/or second electrode 104) comprises an electroactive material. In certain embodiments, the electroactive material in first electrode 102 comprises lithium. First electrode 102 may be a negative electrode and second electrode 104 may be a positive electrode.

In the exemplary embodiments of FIG. 1, electrochemical cell 101 comprise a separator 106 between first electrode 102 and second electrode 104. Separator 106 may comprise pores 108 in which electrolyte can reside. The separator and an ion conductor 112 form a composite structure, which may be bonded together and inhibit delamination or separation of the layers, as described herein. Ion conductor 112 can inhibit interaction of electrolyte with the electroactive material within electrode 102. In certain embodiments, ion conductor 112 substantially prevents interaction of electrolyte with the electroactive material within electrode 102. Inhibiting or preventing the interaction of electrolyte with the electroactive material within electrode 102 can reduce or eliminate the degree to which electrode 102 is degraded or otherwise rendered inoperable by the electrolyte. Thus, in this fashion, ion conductor 112 can function as a protective structure within the electrochemical cell.

It should be appreciated that while FIG. 1 shows an electrochemical cell, in some embodiments not all components shown in the figure need be present. For instance, the articles and methods described herein may encompass only components of electrochemical cells (e.g., a separator and an ion conductor without one of an anode and/or cathode). It should also be appreciated that other components that are not shown in FIG. 1 may be included in electrochemical cells in some embodiments. As one example, an ion conductor layer (e.g., an inorganic layer ion conductor layer) may be a part of a multi-layered structure comprising more than one ion conductor layers. At least two layers (e.g., two ion conductor layers) of the multi-layered structure may be formed of different materials, or the same material. In some cases, at least one of the layers of the multi-layered structure may comprise a lithium oxysulfide material, as described in more detail below. Other configurations are also possible.

It should be understood that, everywhere in which lithium is described as an electroactive material, other suitable electroactive materials (including others described elsewhere herein) could be substituted. In addition, everywhere in which a ceramic is described as the ion conductor, other ion conductor materials (including others described elsewhere herein) could be used.

Figure 2:
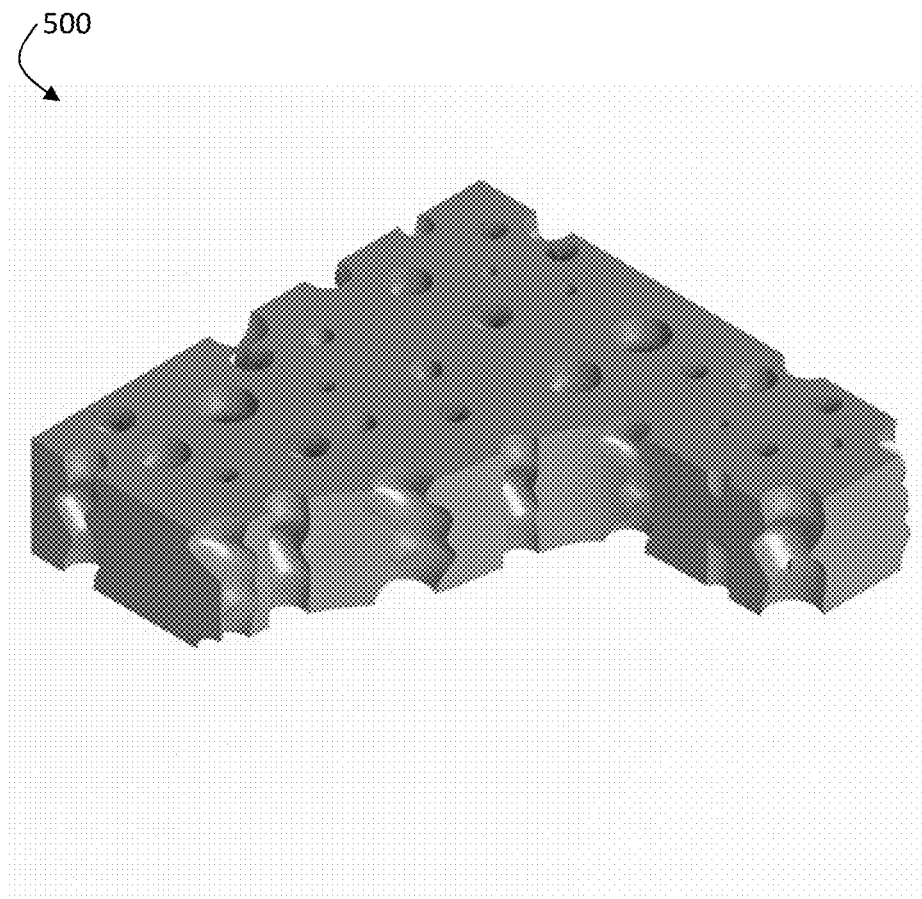
FIG. 2 is an exemplary schematic illustration of, according to some embodiments, of a free-standing separator film comprising tortuous hole paths.

As described herein, a free-standing, porous, separator layer may be used as the polymer matrix on which an ion conductor layer is deposited. According to one exemplary fabrication process, a porous, separator layer 500 is provided, as illustrated in FIG. 2. The porous separator layer may be conductive or non-conductive to ions. One example of a suitable film is a commercially available porous, separator layer, such as those used in battery separators. The hole pathways through the layer can be quite tortuous in some embodiments. In certain embodiments, the hole pathways through the layer pass completely through the layer. This free standing layer can then be coated with an ion conductor (e.g., a ceramic such as a lithium oxysulfide).

The approach of coating a free-standing separator with an ion conductor material offers a number of advantages over methods of fabricating other protective structures. First among these is the fact that the resulting structure does not have to be released from a carrier substrate. This not only results in a cost savings and a reduction of materials, but it avoids the possibility of damaging the fragile ion conductor coating during the release step. Second, binding the ion conductor material to the surface of the separator creates a mechanically stable platform for thin ion conductor (e.g., ceramic) coatings, greatly enhancing the coating's ability to withstand the mechanical stresses encountered when it is placed in a pressurized cell against a rough cathode. Third, such a process can be accomplished in a single chamber pump down. Not having to open the vacuum chamber during the deposition process reduces the chances for contamination as well as minimizes the handling of the material.

As described herein, in some embodiments an ion conductor material can be deposited onto a separator layer using a vacuum deposition process (e.g., sputtering, CVD, thermal or E-beam evaporation). Vacuum deposition can permit the deposition of smooth, dense, and homogenous thin layers. In some embodiments it is desirable to deposit thin layers of an inorganic ion conductor material since thick layers can increase the internal resistance of the battery, lowering the battery rate capability and energy density.

Figure 3:
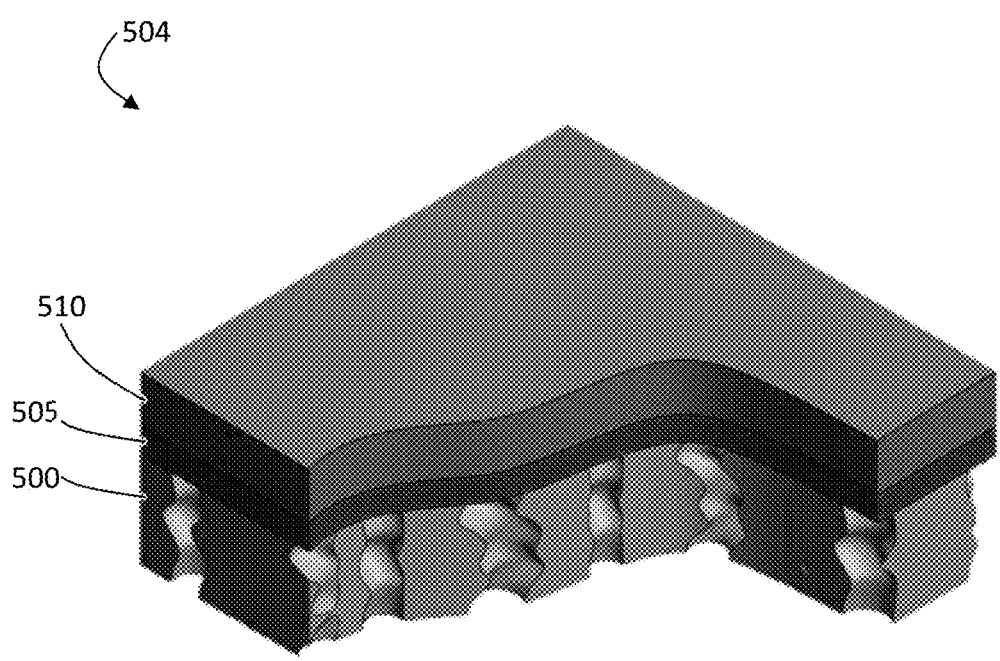
FIG. 3 is an exemplary schematic illustration of, according to some embodiments, of a porous separator coated with an ion conductor layer.

As shown illustratively in structure 504 in FIG. 3, the pores of a separator layer 500 (e.g., a separator) are substantially unfilled with an ion conductor 505 (e.g., ceramic). In embodiments in which all or portions of the pores of the separator layer are unfilled with an inorganic ion conductor (e.g., a ceramic), those portions may be filled with an electrolyte solvent when positioned in an electrochemical cell. In some embodiments, the ion conductor may be coated with a final layer of an electroactive material 510 (e.g., lithium). The electroactive material layer can be configured to adhere to the ion conductive layer, as described in more detail below. In certain embodiments of this process, there is no etching involved, which can make the process very fast and efficient.

It should also be appreciated that although several figures shown herein illustrate a single ion conductor layer, in some embodiments a protective structure includes multiple ion conductor layers (e.g., at least 2, 3, 4, 5, or 6 ion conductor layers) to form a multi-layered structure. As one example, an ion conductor layer (e.g., an inorganic layer ion conductor layer) may be a part of a multi-layered structure comprising more than one ion conductor layers, wherein at least two layers (e.g., two ion conductor layers) of the multi-layered structure are formed of different materials. In other instances, at least two layers of the multi-layered structure (e.g., two ion conductor layers) are formed of the same material. In some cases, at least one of the layers of the multi-layered structure may comprise a lithium oxysulfide material. The multi-layered structure may optionally include polymer layers (e.g., at least 1, 2, 3, 4, 5, or 6 polymer layers). In some embodiments, the polymer layers are interspersed between two or more ion conductor layers. Each of the layers of the multi-layered structure may independently have features (e.g., thickness, conductivity, bulk electronic resistivity) described generally herein for the ion conductor layer and/or polymer layer.

In structures involving a single ion conductor layer, the ion conductor layer (which may comprise a lithium oxysulfide in some embodiments) may be in direct contact with each an electroactive material of a first electrode and the separator layer.

As described herein, in some embodiments involving the formation of a protective structure by disposing an ion conductor on the surface of a separator layer, it is desirable to increase the bonding or adhesive strength between the ion conductor and the separator layer. As a result of increased adhesion between the layers, the likelihood of delamination of the layers can be reduced and the mechanical stability of the ion conductor layer can be improved during cycling of the cell. For example, the resulting ion conductor layer-separator composite can enhance the ion conductor layer's ability to withstand the mechanical stresses encountered when it is placed in a pressurized cell against a rough cathode. Accordingly, in some embodiments, prior to deposition of the ion conductor layer, the surface of the separator layer may be treated (e.g., in a pre-treatment process) to enhance the surface energy of the separator layer. The increased surface energy of the separator layer can allow improved adhesion between the ion conductor layer and the separator compared to when the surface of the separator is not treated.

In certain embodiments, adhesion is enhanced when a ratio of the thickness of the ion conductor layer to the average pore diameter of the separator is present in certain ranges, as described in more detail below.

To increase the surface energy of the separator layer (i.e., activate the surface of the separator layer), a variety of methods may be used. The method may involve, for example, a pre-treatment step in which the surface of the separator is treated prior to deposition of an ion conductor material. In certain embodiments, activation or a pre-treatment step involves subjecting the separator to a source of plasma. For example, an anode layer ion source (ALS) may be used to generate a plasma. In general, an anode layer ion source involves generating electrons by an applied potential in the presence of a working gas. The resulting plasma generated creates additional ions and electrons, which accelerate towards the target substrate (e.g., the separator layer), providing ion bombardment of a substrate. This bombardment of the separator layer substrate increases the surface energy of the separator layer and promotes adhesion between the separator and the ion conductor material to follow.

Various working gases can be used during a surface activation process such as plasma treatment. In general, surface activation may occur in the presence of one or more gases including: air, oxygen, ozone, carbon dioxide, carbonyl sulfide, sulfur dioxide, nitrous oxide, nitric oxide, nitrogen dioxide, nitrogen, ammonia, hydrogen, freons (e.g., $CF_4$, $CF_2Cl_2$, $CF_3Cl$), silanes (e.g., $SiH_4$, $SiH_2(CH_3)_2$, $SiH_3CH_3$), and/or argon.

In general, plasma treatment modifies the surface of the separator by ionizing the working gas and/or surface and, in some instances, forming or depositing activated functional chemical groups onto the surface. In certain embodiments, activation of certain functional groups on the surface of the separator layer may promote binding between the separator layer and an ion conductor material. In certain embodiments, the activated functional groups may include one or more of the following: carboxylates (e.g., —COOH), thiols (e.g., —SH), alcohols (e.g., —OH), acyls (e.g., —CO), sulfonics and/or sulfonic acids (e.g., —SOOH or —$SO_3H$), amines (e.g., —$NH_2$), nitric oxides (e.g., —NO), nitrogen dioxides (e.g., —$NO_2$), chlorides (e.g., —Cl), haloalkyl groups (e.g., $CF_3$), silanes (e.g., $SiH_3$), and/or organosilanes ($SiH_2CH_3$). Other functional groups are also possible.

In certain embodiments, plasma treatment, such as an ALS process, is performed in a chamber at a pressure ranging between, for example, $10^{-2}$ to $10^{-8}$ Torr. For instance, the pressure may be greater than or equal to $10^{-8}$ Torr, greater than or equal to $10^{-7}$ Torr, greater than or equal to $10^{-6}$ Torr, greater than or equal to $10^{-5}$ Torr, greater than or equal to $10^{-4}$ Torr, or greater than or equal to $10^{-3}$ Torr. The pressure may be less than or equal to $10^{-2}$ Torr, less than or equal to $10^{-3}$ Torr, less than or equal to $10^{-4}$ Torr, less than or equal to $10^{-5}$ Torr, or less than or equal to $10^{-6}$ Torr. Combinations of the above-referenced ranges are also possible.

Plasma treatment may generally be performed with a power of the ion source ranging between, for example, 5 W to 200 W. For instance, the power may be greater than or equal to 5 W, great than or equal to 10 W, greater than or equal to 20 W, greater than or equal to 50 W, greater than or equal to 100 W, or greater than or equal to 200 W. The power may be less than or equal to 200 W, or less than or equal to 100 W, or less than or equal to 50 W, or less than or equal to 20 W, or less than or equal to 5 W. Combinations of the above-referenced power ranges are also possible.

Actual surface energy enhancement is a function of pressure, power, and exposure time, with care taken not to overexpose the material which can lead to thermal damage. For example, the exposure time (i.e., the time for which the separator layer is subjected to plasma treatment) may be greater than or equal to 1 second, greater than or equal to 10 seconds, greater than or equal to 30 seconds, greater than or equal to 1 minute, greater than or equal to 2 minutes, greater than or equal to 5 minutes, greater than or equal to 10 minutes, greater than or equal to 20 minutes, greater than or equal to 30 minutes, greater than or equal to 1 hour, or greater than or equal to 5 hours. The exposure time may be less than or equal to 10 hours, less than or equal to 1 hour, less than or equal to 30 minutes, less than or equal to 10 minutes, less than or equal to 5 minutes, less than or equal to 1 minute, less than or equal to 10 seconds, or less than or equal to 1 second. Combinations of the above-referenced exposure times are also possible.

It would be appreciable to those skilled in the art that setup conditions can vary depending on the efficiency of the plasma system, the efficiency of the power supply, RF matching issues, gas distribution and selection, distance from target substrate, time of plasma exposure, etc. Thus, various combinations of power at which the plasma source is operated, the operating pressure, gas selection, and the length of time of exposure to the plasma source are possible.

Although plasma treatment is primarily described for increasing the surface energy of a substrate (e.g., a separator), other methods for increasing the surface energy of a substrate are also possible. For example, in certain embodiments, flame surface treatment, corona treatment, chemical treatment, surface oxidation, absorption of functional groups to the surface, and/or surface grafting may be used to increase the surface energy of a substrate.

The surface energy of the separator layer can be increased to any suitable value. In some embodiments, the surface energy of the separator layer before treatment may be, for example, between 0 and 50 dynes. For example, the surface energy may be at least 0 dynes, at least 10 dynes, at least 20 dynes, at least 30 dynes, at least 40 dynes, or at least 50 dynes. The surface energy may be less than 50 dynes, less than 40 dynes, less than 30 dynes, less than 20 dynes, or less than 10 dynes. Combinations of the above-referenced ranges are also possible.

In some embodiments, the surface energy of the separator layer after treatment may range from, for example, between 30 dynes and 100 dynes (1 dyne=1 g·cm/$s^2$=$10^{-5}$ kg·m/$s^2$=$10^{-5}$ N). In certain embodiments, the surface energy of the separator layer after treatment may be at least 30 dynes, at least 40 dynes, at least 50 dynes, at least 60 dynes, at least 70 dynes, at least 80 dynes, at least 90 dynes. The surface energy after treatment may be, for example, less than 100 dynes, less than 90 dynes, less than 80 dynes, less than 70 dynes, less than 60 dynes, or less than 50 dynes. Combinations of the above-referenced ranges are also possible. Other surface energies are also possible.

In certain embodiments, the surface energy of a separator surface before treatment can be increased at least 1.2 times, at least 1.5 times, at least 2 times, at least 3 times, at least 5 times, at least 10 times, at least 20 times, at least 50 times, at least 70 times, at least 100 times after treatment. In some cases, the surface treatment may be increased up to 500 times after treatment. Other increases in surface energy are also possible.

As described herein, in some embodiments treatment of a surface results in chemical and/or physical bonds between an ion conductor and a separator layer being formed. In some embodiments, the bonds may include covalent bonds. Additionally or alternatively, non-covalent interactions (e.g., hydrophobic and/or hydrophilic interactions, electrostatic interactions, van der Waals interactions) may be formed. Generally, treatment (e.g., pre-treatment) of a surface resulting in bond formation increases the degree of adhesion between two layers compared to the absence of such treatment.

To determine relative adhesion strength between two layers, a tape test can be performed. Briefly, the tape test utilizes pressure-sensitive tape to qualitatively assess the adhesion between a first layer (e.g., a separator layer) and a second layer (e.g., a ion conducting layer). In such a test, an X-cut can be made through the first layer (e.g., separator layer) to the second layer (e.g., ion conducting layer). Pressure-sensitive tape can be applied over the cut area and removed. If the separator layer stays on the ion conducting layer (or vice versa), adhesion is good. If the separator layer comes off with the strip of tape, adhesion is poor. The tape test may be performed according to the standard ASTM D3359-02. In some embodiments, a strength of adhesion between the separator and the inorganic ion conductor layer passes the tape test according to the standard ASTM D3359-02, meaning the ion conductor layer does not delaminate from the separator layer during the test. In some embodiments, the tape test is performed after the two layers (e.g., a first layer such as a separator layer, to a second layer such as an ion conducting layer) have been included in a cell, such as a lithium-sulfur cell or any other appropriate cell described herein, that has been cycled at least 5 times, at least 10 times, at least 15 times, at least 20 times, at least 50 times, or at least 100 times, and the two layers pass the tape test after being removed from the cell (e.g., the first layer does not delaminate from the second layer during the test).

The peel test may include measuring the adhesiveness or force required to remove a first layer (e.g., a separator layer) from a unit length of a second layer (e.g., a ion conducting layer), which can be measured in N/m, using a tensile testing apparatus or another suitable apparatus. Such experiments can optionally be performed in the presence of a solvent (e.g., an electrolyte) or other components to determine the influence of the solvent and/or components on adhesion.

In some embodiments, the strength of adhesion between two layers (e.g., a first layer such as a separator layer and a second layer such as an ion conductor layer) may be increased as a result of a treatment (e.g., pre-treatment) step described herein. The strength of adhesion after treatment may range, for example, between 100 N/m to 2000 N/m. In certain embodiments, the strength of adhesion may be at least 50 N/m, at least 100 N/m, at least 200 N/m, at least 350 N/m, at least 500 N/m, at least 700 N/m, at least 900 N/m, at least 1000 N/m, at least 1200 N/m, at least 1400 N/m, at least 1600 N/m, or at least 1800 N/m. In certain embodiments, the strength of adhesion may be less than or equal to 2000 N/m, less than or equal to 1500 N/m, less than or equal to 1000 N/m, less than or equal to 900 N/m, less than or equal to 700 N/m, less than or equal to 500 N/m, less than or equal to 350 N/m, less than or equal to 200 N/m, less than or equal to 100 N/m, or less than or equal to 50 N/m. Other strengths of adhesion are also possible.

As described herein, the relative thickness of the ion conductor layer to the average pore diameter of the separator layer may influence the degree of adhesive strength or bonding between the two layers in a composite. For instance, in some cases the thickness of the ion conductor layer may be greater than the average pore diameter (or largest pore diameter) of separator layer, which results in the formation of a smooth, dense, and homogenous ion conductor layer that resists delamination from separator layer.

As described herein, in an electrochemical cell, the ion conductor layer may serve as a solvent barrier which acts to prevent or reduce the likelihood of a liquid electrolyte from interacting with an electroactive material (e.g., lithium metal). In some embodiments, the ability of the composite ion conductor layer-separator to act as a barrier can be measured in part by an air permeation test (e.g., the Gurley Test). The Gurley Test determines the time required for a specific volume of air to flow through a standard area of the material. As such, larger air permeation times (Gurley-sec) generally correspond to better barrier properties.

One of ordinary skill in the art may have expected that improved barrier properties (e.g., higher air permeation times) would be achieved by using relatively thicker inorganic ion conductor layers, since thicker layers may be more difficult for fluids to penetrate across the layer. However, as described in more detail below, the inventors observed that a reduced thickness of the ion conductor layer in an inorganic ion conductor layer-separator composite resulted in an improvement in barrier properties, as measured by an increase in air permeation time using the Gurley Test, compared to inorganic ion conductor layer-separator composites having relatively thicker inorganic ion conductor layers (see Example 3 and FIG. 5). Additionally, the combination of a thin inorganic ion conductor layer and a plasma treated separator showed the highest air permeation time (and, therefore, enhanced barrier properties), compared to composites that did not include a plasma treated separator, or a composite that had a relatively thicker inorganic ion conductor layer. Without wishing to be bound by any theory, the inventors believe that high permeation times, and therefore good barrier properties, are contributed in part by good strength of adhesion between the two layers and good mechanical flexibility (i.e., lower film stresses) of the ion conductor layer so as to reduce the likelihood of cracking of the layer. Cracking of the ion conductor layer, similar to delamination between layers, typically results in poorer barrier properties.

In some embodiments, air permeation times of a composite described herein (e.g., an ion conductor layer-separator composite) may be at least 1,000 Gurley-s, at least 5,000 Gurley-s, at least 10,000 Gurley-s, at least 20,000 Gurley-s, at least 40,000 Gurley-s, at least 60,000 Gurley-s, at least 80,000 Gurley-s, at least 100,000 Gurley-s, at least 120,000 Gurley-s, at least 140,000 Gurley-s, at least 160,000 Gurley-s, at least 180,000 Gurley-s, at least 200,000 Gurley-s, at least 500,000 Gurley-s, or at least $10^6$ Gurley-s. In some embodiments, the composite is substantially impermeable. In some embodiments, the air permeation time may be less than or equal to $10^6$ Gurley-s, less than or equal to 500,000 Gurley-s, less than or equal to 200,000 Gurley-s, less than or equal to 150,000 Gurley-s, less than or equal to 120,000 Gurley-s, less than or equal to 80,000 Gurley-s, less than or equal to 40,000 Gurley-s, less than or equal to 20,000 Gurley-s, less than or equal to 10,000 Gurley-s, or less than or equal to 5,000 Gurley-s. The air permeation times and Gurley tests described herein refer to those performed according to TAPPI Standard T 536 om-12, which involves a pressure differential of 3 kPa and a sample size of a square inch.

An ion conductor or ion conductor layer described herein can be formed of a variety of types of materials. In certain embodiments, the material from which the ion conductor is formed may be selected to allow ions (e.g., electrochemically active ions, such as lithium ions) to pass through the ion conductor but to substantially impede electrons from passing across the ion conductor. By "substantially impedes", in this context, it is meant that in this embodiment the material allows lithium ion flux at least ten times greater than electron passage.

In some embodiments, the material used for an ion conductor layer has a high enough conductivity (e.g., at least $10^{-6}$ S/cm, or another conductivity value described herein) in its first amorphous state. The material may also be chosen for its ability to form a smooth, dense and homogenous thin films, especially on a polymer layer such as a separator. Lithium oxysulfides may especially include these characteristics.

The ion conductor can be configured to be electronically non-conductive, in certain embodiments, which can inhibit the degree to which the ion conductor causes short circuiting of the electrochemical cell. In certain embodiments, all or part of the ion conductor can be formed of a material with a bulk electronic resistivity of at least about $10^4$ Ohm-meters, at least about $10^5$ Ohm-meters, at least about $10^{10}$ Ohm-meters, at least about $10^{15}$ Ohm-meters, or at least about $10^{20}$ Ohm-meters. The bulk electronic resistivity may be, in some embodiments, less than or equal to about $10^{20}$ Ohm-meters, or less than or equal to about $10^{15}$ Ohm-meters. Combinations of the above-referenced ranges are also possible. Other values of bulk electronic resistivity are also possible.

In some embodiments, the average ionic conductivity (e.g., lithium ion conductivity) of the ion conductor material is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

In some embodiments, the ion conductor can be a solid. In some embodiments, the ion conductor comprises or may be substantially formed of a non-polymeric material. For example, the ion conductor may comprise or may be substantially formed of an inorganic material.

Although a variety of materials can be used as an ion conductive layer, in one set of embodiments, the ion conductor layer is an inorganic ion conductive layer. For example, the inorganic ion conductor layer may be a ceramic, a glass, or a glassy-ceramic. In some embodiments, the ion conductor comprises an oxysulfide such as lithium oxysulfide.

In certain embodiments in which an inorganic ion conductor material described herein comprises a lithium oxysulfide, the lithium oxysulfide (or an ion conductor layer comprising a lithium oxysulfide) may have an oxide content between 0.1-20 wt %. The oxide content may be measured with respect to the total weight of the lithium oxysulfide material or the total weight of the ion conductor layer that comprises the lithium oxysulfide material. For instance, the oxide content may be at least 0.1 wt %, at least 1 wt %, at least 2 wt %, at least 5 wt %, at least 10 wt %, %, at least 15 wt %, or at least 20 wt %. In some embodiments, the oxide content may be less than or equal to 20 wt %, less than or equal to 15 wt %, less than or equal to 10 wt %, less than or equal to 5 wt %, less than or equal to 2 wt %, or less than or equal to 1 wt % of the lithium oxysulfide. Combinations of the above-noted ranges are also possible. The elemental composition, including oxide content, of a layer may be determined by methods such as energy-dispersive X-ray spectroscopy.

In some embodiments in which an inorganic ion conductor material described herein comprises a lithium oxysulfide, the lithium oxysulfide material (or an ion conductor layer comprising a lithium oxysulfide) has an atomic ratio of sulfur atoms to oxygen atoms (S:O) of between, for example, 1:1 to 1000:1. For instance, the atomic ratio between sulfur atoms to oxygen atoms (S:O) in the lithium oxysulfide material (or an ion conductor layer comprising a lithium oxysulfide) may be at least 0.5:1, at least 0.667:1, at least 1:1, at least 2:1, at least 3:1, at least 4:1, at least 5:1, at least 10:1, at least 20:1, at least 50:1, at least 70:1, at least 90:1, at least 100:1, at least 200:1, at least 500:1, or at least 1000:1. The atomic ratio of sulfur atoms to oxygen atoms (S:O) in the lithium oxysulfide material (or an ion conductor layer comprising a lithium oxysulfide) may be less than or equal to 1000:1, less than or equal to 500:1, less than or equal to 200:1, less than or equal to 100:1, less than or equal to 90:1, less than or equal to 70:1, less than or equal to 50:1, less than or equal to 20:1, less than or equal to 10:1, less than or equal to 5:1, less than or equal to 3:1, or less than or equal to 2:1. Combinations of the above-noted ranges are also possible (e.g., an atomic ratio of S:O of between 2:1 to 1000:1, or between 4:1 to 100:1). Other ranges are also possible. The elemental composition of a layer may be determined by methods such as energy-dispersive X-ray spectroscopy.

It should be noted that the atomic ratio may also be expressed as a ratio of oxygen atoms to sulfur atoms (O:S) and that the reverse of the above-noted ratios may be applicable. For instance, in some embodiments the lithium oxysulfide material (or an ion conductor layer comprising a lithium oxysulfide) comprises a lithium oxysulfide having an atomic ratio of oxygen atoms to sulfur atoms (O:S) in the range of from 0.001:1 to 1.5:1, e.g., in the range of from 0.01:1 to 0.25:1.

In some embodiments, a lithium oxysulfide material described herein may have a formula of $x(yLi_2S+zLi_2O)+MS_2$ (where M is Si, Ge, or Sn), where $y+z=1$, and where x may range from 0.5-3. In certain embodiments, x is at least 0.5, at least 1.0, at least 1.5, at least 2.0, or at least 2.5. In other embodiments, x is less than or equal to 3.0, less than or equal to 2.5, less than or equal to 2.0, less than or equal to 1.5, less than or equal to 1.0, or less than or equal to 0.5. Combinations of the above-noted ranges are also possible. Other values for x are also possible.

The ion conductor may comprise, in some embodiments, an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments, the inorganic ion conductor, such as a lithium oxysulfide described above, comprises a glass forming additive ranging from 0 wt % to 30 wt % of the inorganic ion conductor material. Examples of glass forming additives include, for example, $SiO_2$, $Li_2SiO_3$, $Li_4SiO_4$, $Li_3PO_4$, $LiPO_3$, $Li_3PS_4$, $LiPS_3$, $B_2O_3$, $B_2S_3$. Other glass forming additives are also possible. In certain embodiments, glass forming additives may be at least 5 wt %, at least 10 wt %, at least 15 wt %, at least 20 wt %, at least 25 wt %, or at least 30 wt % of the inorganic ion conductor material. In certain embodiments, glass forming additives may be less than or equal to 30 wt %, less than or equal to 25 wt %, less than or equal to 20 wt %, less than or equal to 15 wt %, or less than or equal to 10 wt % of the inorganic ion conductor material. Combinations of the above-noted ranges are also possible. Other values of glass forming additives are also possible.

In some embodiments, one or more additional salts (e.g., lithium salts such as LiI, LiBr, LiCl, $Li_2CO_3$, or $Li_2SO_4$) may be added to the inorganic ion conductor material at a range of, e.g., 0 to 50 mol %. Other salts are also possible. In certain embodiments, additional salts are at least 0 mol %, at least 10 mol %, at least 20 mol %, at least 30 mol %, at least 40 mol %, or at least 50 mol %. In certain embodiments, additional salts are less than or equal to 50 mol %, less than or equal to 40 mol %, less than or equal to 30 mol %, less than or equal to 20 mol %, or less than or equal to 10 mol %. Combinations of the above-noted ranges are also possible. Other values of mol % are also possible.

Additional examples of ion conductors include lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof.

In certain embodiments, the ion conductor is formed of a single-ion conductive material (e.g., a single-ion conductive ceramic material).

Those of ordinary skill in the art, given the present disclosure, would be capable of selecting appropriate materials for use as the ion conductor. Relevant factors that might be considered when making such selections include the ionic conductivity of the ion conductor material; the ability to deposit or otherwise form the ion conductor material on or with other materials in the electrochemical cell; the brittleness of the ion conductor material; the compatibility of the ion conductor material with the polymer or separator material; the compatibility of the ion conductor material with the electrolyte of the electrochemical cell; the ion conductivity of the material (e.g., lithium ion conductivity); and/or the ability to adhere the ion conductor to the separator material.

The ion conductor material may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

As described herein, in certain preferred embodiments, an ion conductor material can be deposited onto a separator using a vacuum deposition process (e.g., sputtering, CVD, thermal or E-beam evaporation). Vacuum deposition can permit the deposition of smooth, dense, and homogenous thin layers.

In embodiments in which the ion conductor is in the form of a layer (e.g., a layer adjacent and/or attached to a polymer layer (e.g., a separator)), the thickness of the ion conductor layer may vary. The thickness of an ion conductor layer may vary over a range from, for example, 1 nm to 7 microns. For instance, the thickness of the ion conductor layer may be between 1-10 nm, between 10-100 nm, between 10-50 nm, between 30-70 nm, between 100-1000 nm, or between 1-7 microns. The thickness of an ion conductor layer may, for example, be less than or equal to 7 microns, less than or equal to 5 microns, less than or equal to 2 microns, less than or equal to 1000 nm, less than or equal to 600 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, an ion conductor layer is at least 10 nm thick, at least 20 nm thick, at least 30 nm thick, at least 100 nm thick, at least 400 nm thick, at least 1 micron thick, at least 2.5 microns thick, or at least 5 microns thick. Other thicknesses are also possible. Combinations of the above-noted ranges are also possible.

As described herein, the methods and articles provided herein may allow the formation of smooth surfaces. In some embodiments, the root mean square (RMS) surface roughness of an ion conductor layer of a protective structure may be, for example, less than 1 µm. In certain embodiments, the RMS surface roughness for such surfaces may be, for example, between 0.5 nm and 1 µm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 µm, less than or equal to 0.8 µm, less than or equal to 0.7 µm, less than or equal to 0.6 µm, less than or equal to 0.5 µm, less than or equal to 0.4 µm, less than or equal to 0.3 µm, less than or equal to 0.2 µm, less than or equal to 0.1 µm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 µm and greater than 10 nm). A polymer layer of a protective structure may have a RMS surface roughness of one or more of the ranges noted above.

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25 degrees Celsius).

In some embodiments, the separator can be ionically conductive, while in other embodiments, the separator is substantially ionically non-conductive. In some embodiments, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm).

In some embodiments, the separator can be a solid. The separator may be porous to allow an electrolyte solvent to pass through it. In some cases, the separator does not substantially include a solvent (like in a gel), except for solvent that may pass through or reside in the pores of the separator. In other embodiments, a separator may be in the form of a gel.

In certain embodiments, a separator may comprise a mixture of a polymeric binder, which may include one or more polymeric materials described herein (e.g., the polymers listed below for the separator), and a filler comprising a ceramic or a glassy/ceramic material, such as a material described herein for an ion conductor layer.

A separator as described herein can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity, if desired.

Further examples of separators and separator materials suitable for use include those comprising a microporous xerogel layer, for example, a microporous pseudo-boehmite layer, which may be provided either as a free standing film or by a direct coating application on one of the electrodes, as described in U.S. Pat. No. 6,153,337, filed Dec. 19, 1997 and, entitled "Separators for electrochemical cells," and U.S. Pat. No. 6,306,545 filed Dec. 17, 1998 and entitled "Separators for electrochemical cells." Solid electrolytes and gel electrolytes may also function as a separator in addition to their electrolyte function. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Other suitable materials that could be used to form all or part of the separator include the separator materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the separator. Relevant factors that might be considered when making such selections include the ionic conductivity of the separator material; the ability to deposit or otherwise form the separator material on or with other materials in the electrochemical cell; the flexibility of the separator material; the porosity of the separator material (e.g., overall porosity, average pore size, pore size distribution, and/or tortuosity); the compatibility of the separator material with the fabrication process used to form the electrochemical cell; the compatibility of the separator material with the electrolyte of the electrochemical cell; and/or the ability to adhere the separator material to the ion conductor material. In certain embodiments, the separator material can be selected based on its ability to survive ion conductor deposition processes without mechanically failing. For example, in embodiments in which relatively high temperatures or high pressures are used to form the ion conductor material (e.g., a ceramic ion conductor material), the separator material can be selected or configured to withstand such high temperatures and pressures.

Those of ordinary skill in the art can employ a simple screening test to select an appropriate separator material from candidate materials. One simple screening test involves positioning a material as a separator in an electrochemical cell which, to function, requires passage of an ionic species across the material (e.g., through pores of the material) while maintaining electronic separation. If the material is substantially ionically conductive in this test, then electrical current will be generated upon discharging the electrochemical cell. Another simple screening test involves the ability to increase the surface energy of the separator by various methods described herein. A screening test may also involve testing the adhesion between the separator and an ion conductor layer as described herein. Another screening test may involve testing the ability of the separator to not swell in the presence of an electrolyte to be used in an electrochemical cell. Other simple tests can be conducted by those of ordinary skill in the art.

The thickness of the separator may vary. The thickness of the separator may vary over a range from, for example, 5 microns to 40 microns. For instance, the thickness of the separator may be between 10-20 microns, between 20-30 microns, or between 20-40 microns. The thickness of the separator may be less than or equal to, e.g., 40 microns, less than or equal to 30 microns, less than or equal to 25 microns, less than or equal to 10 microns, or less than or equal to 9 microns. In some embodiments, the separator is at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

As described herein, a separator may have a smooth surface. In some embodiments, the RMS surface roughness of a separator may be, for example, less than 1 µm. In certain embodiments, the RMS surface roughness for such surfaces may be, for example, between 0.5 nm and 1 µm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 µm, less than or equal to 0.8 µm, less than or equal to 0.7 µm, less than or equal to 0.6 µm, less than or equal to 0.5 µm, less than or equal to 0.4 µm, less than or equal to 0.3 µm, less than or equal to 0.2 µm, less than or equal to 0.1 µm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 µm and greater than 10 nm.

As described herein, the separator may be porous. In some embodiments, the separator pore size may be, for example, less than 5 microns. In certain embodiments, the separator pore size may be between 50 nm and 5 microns, between 50 nm and 500 nm, between 100 nm and 300 nm, between 300 nm and 1 micron, between 500 nm and 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm).

As described herein, the relative thickness of the ion conductor layer to the average pore diameter of the separator, which is positioned adjacent the ion conductor layer, may influence the degree of adhesive strength of the two layers. For instance, the thickness of the ion conductor layer may be greater than the average pore diameter (or largest pore diameter) of separator. In certain embodiments, the average thickness of the ion conductor layer is at least 1.1 times, at least 1.2 times, at least 1.5 times, at least 1.7 times, at least 2 times, at least 2.5 times, at least 2.7 times, at least 2.8 times, at least 3.0 times, at least 3.2 times, at least 3.5 times, at least 3.8 times, at least 4.0 times, at least 5.0 times, at least 7.0 times, at least 10.0 times, or at least 20.0 times the average pore size (or the largest pore diameter) of the separator adjacent the ion conductor layer. In certain embodiments, the average thickness of the ion conductor layer may be less than or equal to 20.0 times, less than or equal to 10.0 times, less than or equal to 7.0 times, less than or equal to 5.0 times, less than or equal to 4.0 times, less than or equal to 3.8 times, less than or equal to 3.5 times, less than or equal to 3.2 times, less than or equal to 3.0 times, less than or equal to 2.8 times, less than or equal to 2.5 times, or less than or equal to 2 times the average pore size (or the largest pore diameter) of the separator adjacent the ion conductor layer. Other combinations of average pore diameter and ion conductor layer thicknesses are also possible.

The ratio of thickness of the ion conductor layer to average pore diameter of the separator may be, for example, at least 1:1 (e.g., 1.1:1), at least 2:1, at least 3:2, at least 3:1, at least 4:1, at least 5:1, or at least 10:1. The ratio of thickness of the ion conductor layer to average pore diameter of the separator may be less than or equal to 10:1, less than or equal to 5:1, less than or equal to 3:1, less than or equal to 2:1 (e.g., 1.1:1), or less than or equal to 1:1. Other ratios are also possible. Combinations of the above-noted ranges are also possible.

As described herein, various methods may be used to form ion conductor/separator composite. The thickness of the composite may vary over a range from, for example, 5 microns to 40 microns. For instance, the thickness of the composite may be between 10-20 microns, between 20-30 microns, or between 20-40 microns. The thickness of the composite may be, for example, less than or equal to 40 microns, less than or equal to 30 microns, less than or equal to 25 microns, less than or equal to 10 microns, less than or equal to 9 microns, or less than or equal to 7 microns. In some embodiments, the composite is at least 5 microns thick, at least 7 microns thick, at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

In some embodiments, the average ionic conductivity (e.g., lithium ion conductivity) of the composite is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm, at least about 1 S/cm, at least about 10 S/cm. Conductivity may be measured at room temperature (e.g., 25 degrees Celsius).

A composite structure described herein including an ion conductor layer and a separator may be a free-standing structure that may be packaged alone (optionally with suitable components such as a substrate for handling), together with an electroactive material to form a protected electrode, or assembled into an electrochemical cell.

In certain embodiments, an electrochemical cell comprises a first electrode comprising an electroactive material, a second electrode and a composite positioned between the first and second electrodes. The composite comprises a separator comprising pores having an average pore size and an inorganic ion conductor layer bonded to the separator. The separator may have a bulk electronic resistivity of at least $10^4$ Ohm meters (e.g., at least $10^{10}$ Ohm meters, or at least $10^{15}$ Ohm meters, e.g., between $10^{10}$ Ohm meters to $10^{15}$ Ohm meters). The inorganic ion conductor layer has a lithium-ion conductivity of at least at least $10^{-6}$ S/cm, and comprises a lithium oxysulfide having an oxide content between 0.1-20 wt %.

The ion conductor layer comprising the lithium oxysulfide may be a single layer in direct contact with each of the first electrode and the separator. In other cases, the ion conductor layer is a part of a multi-layered structure comprising more than one ion conductor layers. Optionally, at least two layers of the multi-layered structure are formed of different materials. In other cases, at least two layers of the multi-layered structure are formed of the same material.

The lithium oxysulfide may have a formula of $x(yLi_2S+zLi_2O)+MS_2$ (where M is Si, Ge, or Sn), where $y+z=1$, and where x may range from 0.5-3. Optionally, the ion conductor layer comprises a glass forming additive ranging from 0 wt % to 30 wt % of the inorganic ion conductor material. The ion conductor layer may also optionally comprise one or more lithium salts, such as LiI, LiBr, LiCl, $Li_2CO_3$, or $Li_2SO_4$, although other salts described herein are also possible. The one or more lithium salts may be added to the inorganic ion conductor material at a range of, e.g., 0 to 50 mol %.

The strength of adhesion between the separator and the inorganic ion conductor layer may be sufficiently strong to pass the tape test according to the standard ASTM D3359-02, in some instances. The strength of adhesion between the separator and the inorganic ion conductor layer may be, in some cases, at least 350 N/m or at least 500 N/m. In some cases, the inorganic ion conductor layer is bonded to the separator by covalent bonding. Covalent bonding may be achieved by suitable methods described herein, and one embodiment, involves plasma treatment of the separator prior to addition or joining of the inorganic ion conductor layer and the separator.

In some cases, a ratio of a thickness of the inorganic ion conductor layer to the average pore size of the separator is at least 1.1:1 (e.g., at least 2:1, at least 3:1, or at least 5:1).

The inorganic ion conductor layer may have a thickness of less than or equal to 2.0 microns (e.g., less than or equal to 1.5 microns, less than or equal to 1.3 microns, less than or equal to 1 micron, less than or equal to 800 nm, less than or equal to 600 nm, or between 400 nm and 600 nm).

In some instances, a separator having a thickness between 5 microns and 40 microns is included. The separator may be a solid, polymeric separator. For instance, the separator may comprises or be formed of one or more of poly(n-pentene-2), polypropylene, polytetrafluoroethylene, a polyamide (e.g., polyamide (Nylon), poly(ε-caprolactam) (Nylon 6), poly(hexamethylene adipamide) (Nylon 66)), a polyimide (e.g., polynitrile, and poly(pyromellitimide-1,4-diphenyl ether) (Kapton®) (NOMEX®) (KEVLAR®)), polyether ether ketone (PEEK), and combinations thereof. The separator may also comprise or be formed of other polymers or materials described herein.

In certain embodiments, a separator may comprise a mixture of a polymeric binder and a filler comprising a ceramic or a glassy/ceramic material, such as a material described herein for an ion conductor layer.

The separator may have an average pore size of less than or equal to 5 microns, less than or equal to 1 micron, less than or equal to 0.5 microns, between 0.05-5 microns, or between 0.1-0.3 microns.

The composite may have an air permeation time of at least 20,000 Gurley-s, at least 40,000 Gurley-s, at least 60,000 Gurley-s, at least 80,000 Gurley-s, at least 100,000 Gurley-s, or at least 120,000 Gurley-s according to Gurley test TAPPI Standard T 536 om-12. The composite may have an air permeation time of less than or equal to 300,000 Gurley-s according to Gurley test TAPPI Standard T 536 om-12.

The composite may be formed by, for example, depositing the ion conductor layer onto the separator by a vacuum deposition process such as electron beam evaporation or by a sputtering process.

Although the composites described herein may be used in various electrochemical cells, in one set of embodiments, the composite is included in a lithium cell, such as a lithium-sulfur cell. Accordingly, a first electrode may comprise lithium, such as lithium metal and/or a lithium alloy, as a first electroactive material, and a second electrode comprises sulfur as a second electroactive material.

In one set of embodiments, the electrochemical cell is a lithium-sulfur cell comprising a first electrode comprising lithium, a second electrode comprising sulfur, a separator arranged between said first electrode and said second electrode, and a solid ion conductor contacting and/or bonded to the separator, wherein said solid ion conductor comprises a lithium-ion conducting oxysulfide.

In embodiments in which a polymer layer is positioned on a substrate (e.g., an ion conductor layer), e.g., as part of a multi-layer protective structure, it should be appreciated that the polymer layer may be cured or otherwise prepared directly onto the substrate, or the polymer may be added separately to the substrate.

The polymer layer can be a solid (e.g., as opposed to a gel). The polymer layer can be configured to be electronically non-conductive, in certain embodiments, and may be formed of a material with a bulk electronic resistivity of at least about $10^4$, at least about $10^5$, at least about $10^{10}$, at least about $10^{15}$, or at least about $10^{20}$ Ohm-meters.

In some embodiments, the polymer can be ionically conductive. In some embodiments, the average ionic conductivity of the polymer is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the polymer may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity may be measured at room temperature (e.g., 25 degrees Celsius).

A polymer layer described herein can be made of a variety of materials. Examples of materials that may be suitable for use in the polymer layer include, but are not limited to, polyamines (e.g., poly(ethylene imine) and polypropylene imine (PPI)); polyamides (e.g., polyamide (Nylon), poly(ε- caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly (N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly (isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly (ethylene oxide) (PEO), poly(propylene oxide) (PPO), poly (tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyamides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known. Accordingly, those of ordinary skill in the art can choose suitable polymers based on their mechanical and/or electronic properties (e.g., ionic and/or electronic conductivity), and/or can modify such polymers to be ionically conducting (e.g., conductive towards single ions) based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB (Ph)$_4$, LiPF$_6$, LiC(SO$_2$CF$_3$)$_3$, and LiN(SO$_2$CF$_3$)$_2$), to enhance ionic conductivity.

Those of ordinary skill in the art, given the present disclosure, would be capable of selecting appropriate materials for use as a polymer layer. Relevant factors that might be considered when making such selections include the ionic conductivity of the polymer material; the ability to deposit or otherwise form the polymer material on or with other materials in the electrochemical cell; the flexibility of the polymer material; the porosity of the polymer material (e.g., overall porosity, pore size distribution, and/or tortuosity); the compatibility of the polymer material with the fabrication process used to form the electrochemical cell; the compatibility of the polymer material with the electrolyte of the electrochemical cell; and/or the ability to adhere the polymer material to the ion conductor material.

The thickness of the polymer layer may vary. The thickness of the polymer layer may be less than or equal to, e.g., 40 microns, less than or equal to 30 microns, less than or equal to 25 microns, less than or equal to 10 microns, less than or equal to 5 microns, less than or equal to 3 microns, less than or equal to 2 microns, less than or equal to 1 micron, less than or equal to 0.5 microns, less than or equal to 0.1 microns, less than or equal to 0.05 microns. In some embodiments, the polymer layer is at least 0.01 microns thick, at least 0.05 microns thick, at least 0.1 microns thick, at least 0.5 microns thick, at least 1 micron thick, at least 2 microns thick, at least 5 microns thick, at least 10 microns thick, at least 20 microns thick, at least 25 microns thick, at least 30 microns thick, or at least 40 microns thick. Other thicknesses are also possible. Combinations of the above-noted ranges are also possible.

In some embodiments, an electrode, such as a first electrode (e.g., electrode 102 in FIGS. 1A and 1B) comprises an electroactive material comprising lithium. Suitable electroactive materials comprising lithium include, but are not limited to, lithium metal (such as lithium foil and/or lithium deposited onto a conductive substrate) and lithium metal alloys (e.g., lithium-aluminum alloys and lithium-tin alloys). In some embodiments, the electroactive lithium-containing material of an electrode comprises greater than 50 wt % lithium. In some cases, the electroactive lithium-containing material of an electrode comprises greater than 75 wt % lithium. In still other embodiments, the electroactive lithium-containing material of an electrode comprises greater than 90 wt % lithium. Other examples of electroactive materials that can be used (e.g., in the first electrode, which can be a negative electrode) include, but are not limited to, other alkali metals (e.g., sodium, potassium, rubidium, caesium, francium), alkaline earth metals (e.g., beryllium, magnesium, calcium, strontium, barium, radium), and the like. In some embodiments, the first electrode is an electrode for a lithium ion electrochemical cell. In some cases, the first electrode is an anode or negative electrode.

The second electrode (e.g., electrode 102 in FIGS. 1A and 1B) can comprise a variety of suitable electroactive materials. In some cases, the second electrode is a cathode or positive electrode.

In some embodiments, the electroactive material within an electrode (e.g., within a positive electrode) can comprise metal oxides, such as LiCoO$_2$, LiCo$_x$Ni$_{(1-x)}$O$_2$, LiCo$_x$Ni$_y$Mn$_{(1-x-y)}$ (e.g., LiNi$_{1/3}$Mn$_{1/3}$Co$_{1/3}$O$_2$), LiMn$_2$O$_4$, and combinations thereof. In some embodiments, the electrode active material within an electrode (e.g., within a positive electrode) can comprise lithium transition metal phosphates (e.g., LiFePO$_4$), which can, in certain embodiments, be substituted with borates and/or silicates.

In certain embodiments, the electroactive material within an electrode (e.g., within a positive electrode) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf. Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, an electrode (e.g., a positive electrode) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In certain embodiments, it may be desirable to use polypyrroles, polyanilines, and/or polyacetylenes as conductive polymers.

In certain embodiments, the electrode active material within an electrode (e.g., within a positive electrode) can comprise sulfur. In some embodiments, the electroactive material within an electrode can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a positive electrode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur is described predominately as an electroactive species in the second electrode (which can be, for example, a porous positive electrode), it is to be understood that wherever sulfur is described as a component of an electroactive material within an electrode herein, any suitable electroactive species may be used. For example, in certain embodiments, the electroactive species within the second electrode (e.g., a porous positive electrode) can comprise a hydrogen-absorbing alloy, such as those commonly used in nickel metal hydride batteries. One of ordinary skill in the art, given the present disclosure, would be capable of extending the ideas described herein to electrochemical cells containing electrodes employing other active materials.

The embodiments described herein may be used in association with any type of electrochemical cell. In certain embodiments, the electrochemical cell is a primary (non-rechargeable) battery. In other embodiments, the electrochemical cell may be a secondary (rechargeable) battery. Certain embodiments relate to lithium rechargeable batteries. In certain embodiments, the electrochemical cell comprises a lithium-sulfur rechargeable battery. However, wherever lithium batteries are described herein, it is to be understood that any analogous alkali metal battery can be used. Additionally, although embodiments of the invention are particularly useful for protection of a lithium anode, the embodiments described herein may be applicable to other applications in which electrode protection is desired.

Any suitable electrolyte may be used in the electrochemical cells described herein. Generally, the choice of electrolyte will depend upon the chemistry of the electrochemical cell, and, in particular, the species of ion that is to be transported between electrodes in the electrochemical cell. Suitable electrolytes can comprise, in some embodiments, one or more ionic electrolyte salts to provide ionic conductivity and one or more liquid electrolyte solvents, gel polymer materials, or other polymer materials. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

The electrolyte can comprise one or more ionic electrolyte salts to provide ionic conductivity. In some embodiments, one or more lithium salts (e.g., LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$) can be included. Other electrolyte salts that may be useful include lithium polysulfides ($Li_2S_x$), and lithium salts of organic ionic polysulfides ($LiS_xR)_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary.

It should be understood that the electrochemical cells and components shown in is the figures are exemplary, and the orientation of the components can be varied. Additionally, non-planar arrangements, arrangements with proportions of materials different than those shown, and other alternative arrangements are useful in connection with certain embodiments of the present invention. A typical electrochemical cell could also include, for example, a containment structure, current collectors, external circuitry, and the like. Those of ordinary skill in the art are well aware of the many arrangements that can be utilized with the general schematic arrangement as shown in the figures and described herein.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

The following example is intended to illustrate certain embodiments of the present invention, but does not exemplify the full scope of the invention.

EXAMPLES

Example 1A

This example describes a method for generating an ion conductor layer on a free-standing separator (e.g., an ion conductor-separator composite), with improved adhesive strength between the layers.

A commercial separator, Celgard 2400, having a pore diameter between 100 nm to 200 nm, was used as a substrate. The separator was pre-treated with plasma using an Anode Layer Ion Source in a chamber at a pressure of $10^{-3}$ Torr, a power of 50 W, in the presence of argon gas. The treatment continued for 7 minutes. Before plasma treatment, the surface energy of the separator was 32 dynes. The separator surface energy after plasma treatment was greater than 70 dynes, as measured by a dyne pen set.

Figure 4A:
FIGS. 4A, 4B, and 4C are exemplary scanning electron microscopy (SEM) images of ceramic coatings deposited on a commercial separator.
Figure 4B:
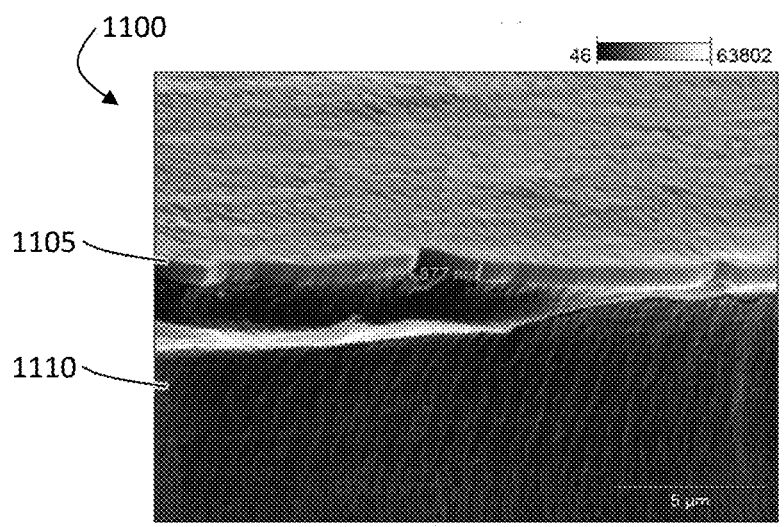
Figure 4C:
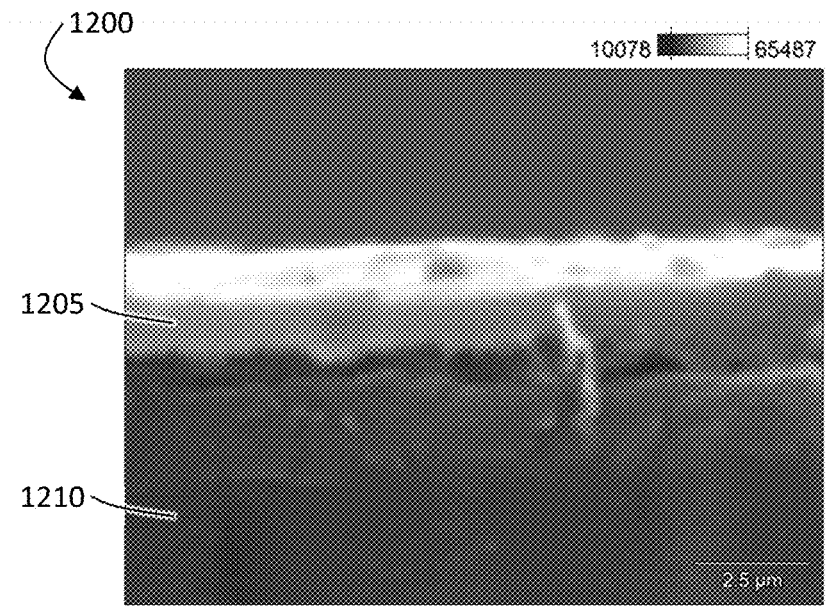

Next, a layer of lithium oxysulfide, an ion conductor, was deposited onto the separator to form an ion conductor layer by e-beam evaporation. The major components of the lithium oxysulfide layer were lithium, silicon, sulfur and oxygen, with the following ratios: 1.5:1 for Si:O, 4.5:1 for S:O, and 3.1:1 for S:Si. In three experiments, the thickness of the ion conductor layer ranged from about 600-800 nm, as shown in FIGS. 4A-4C. The ratio of thickness of the ion conductor layer to pore diameter of the separator in these experiments ranged from about 3:1 to 8:1.

FIGS. 4A, 4B, and 4C are scanning electron microscopy (SEM) images showing the ion conductor (lithium oxysulfide) coating on the commercial separator. FIG. 4A is an SEM of the lithium oxysulfide coating on a 25-micron-thick separator. The thickness of the lithium oxysulfide layer was 610 nm. FIG. 4B is an SEM of a lithium oxysulfide layer on a 25 micron separator. The thickness of the lithium oxysulfide layer was 661 nm. FIG. 4C is an SEM cross-sectional image of an 800 nm thick lithium oxysulfide coating on the separator material. These images also show that the lithium oxysulfide material did not penetrate into the separator's pores.

A tape test was performed according to standard ASTM-D3359-02 to determine adhesiveness between the ion conductor layer and the separator. The test demonstrated that the ion conductor was well bonded to the separator and did not delaminate from the separator.

This example shows that pre-treatment of the surface of the separator with plasma prior to deposition of an ion conductor (lithium oxysulfide) layer enhanced adhesion of the ion conductor layer to the separator, compared to the absence of a pre-treatment step (Comparative Example 1).

Example 1B

An ion conductor-separator composite similar to that described in Example 1A was formed except the lithium oxysulfide ion conductor layer had a thickness of 1 micron. The surface of the separator was treated to plasma as described in Example 1A prior to deposition of the lithium oxysulfide layer.

The final composite demonstrated 17 times reduced air permeation rates compared with an untreated separator (i.e., a separator that was not treated to plasma prior to deposition of the lithium oxysulfide layer, Comparative Example 1), as determined by a Gurley test performed with a pressure differential of 3 kPa (TAPPI Standard T 536 om-12). The final composite had an air permeation time of over 168 minutes, compared to about 9.7 minutes for the composite including the untreated separator (Comparative Example 1).

This example shows that pre-treatment of the surface of the separator with plasma prior to deposition of an ion conductor (lithium oxysulfide) layer enhanced air permeation time of the composite, compared to a composite that included an untreated separator (Comparative Example 1).

Comparative Example 1

The following is a comparative example describing an ion conductor layer that was poorly bonded to a separator.

The method described in Example 1 was used to form an ion conductor-separator composite, except here the separator was not treated with plasma prior to deposition of the ion conductor layer.

The ion conductor-separator composite did not pass the tape test, demonstrating delamination of the ion conductor layer from the separator.

At a ceramic thickness of 1 micron, the air permeation time was below 9.7 minutes as determined by a Gurley Test (TAPPI Standard T 536 om-12).

Example 2

This example shows the formation and performance of the ion conductor-separator composite of Example 1 in a lithium-sulfur electrochemical cell.

The ion conductor (lithium oxysulfide)-coated separator of Example 1 was vacuum coated with metallic lithium (~25 microns of lithium deposited on top of the lithium oxysulfide layer). The lithium anode was protected with the lithium oxysulfide-coated separator and was assembled into a lithium-sulfur battery cell.

The cathode contained 55% weight percent sulfur, 40% weight percent of carbon black and 5% weight percent of polyvinyl alcohol binder. The sulfur surface loading was approximately 2 mg/cm$^2$.

The active electrode covered a total surface area of 16.57 cm$^2$. The lithium-sulfur battery cells were filled with an electrolyte containing 16% weight percent of lithium bis (Trifluoromethanesulfonyl)imide, 42% weight percent of dimethoxyethane, and 42% weight percent of 1,3-dioxolane solvents.

The lithium-sulfur battery cells were discharged at 3 mA to 1.7 V and were charged at 3 mA. Charge was terminated when the lithium-sulfur battery cell reached 2.5 V or when charge time exceeded 15 hours if the cells were not able reaching 2.5 V.

The lithium-sulfur battery cells were cycled over 30 times and showed the ability to reach 2.5 V at every cycle, demonstrating that the lithium oxysulfide layer performed well as a barrier, protecting lithium from the polysulfide shuttle. Multiple cells autopsied after 10 charge cycles showed no defects in the lithium oxysulfide layer and showed no evidence of lithium metal deposition on top of the lithium oxysulfide layer. All lithium was deposited under the lithium oxysulfide layer. Autopsies also showed that the ceramic and separator materials were well bonded after cycling.

Comparative Example 2

This example shows the formation and performance of the ion conductor-separator composite of Comparative Example 1 in a lithium-sulfur electrochemical cell.

Anodes with vacuum deposited lithium on the top of the ion conductor-separator composite of Comparative Example 1 were assembled into lithium-sulfur battery cells and tested similarly as described in Example 2.

These cells were unable to be charged to 2.5 V over 30 cycles. Instead, charge time was at least 15 hours and charge voltage leveled at 2.37-2.41 V. These results demonstrate that the lithium was not protected from the polysulfide shuttle during cycling. Autopsy showed that the lithium oxysulfide layer had defects and a substantial portion of lithium (~20-30% of the surface area) was deposited on the top of this layer.

Example 3

This example demonstrates the ability of ion conductor-separator composites (fabricated similarly to the method described in Example 1) to act as a barrier to fluids, as demonstrated by air permeation testing (Gurley test). Each of the samples included a 25 micron thick separator with pore diameters ranging between 0.1 micron to 0.5 microns, and a coating of lithium oxysulfide on top of the separator. Samples 1, 2, 3, and 6 included separators that were plasma treated before the addition of the lithium oxysulfide. Samples 4, 5, and 7 included separators that were untreated before the addition of the lithium oxysulfide layer.

Figure 5:
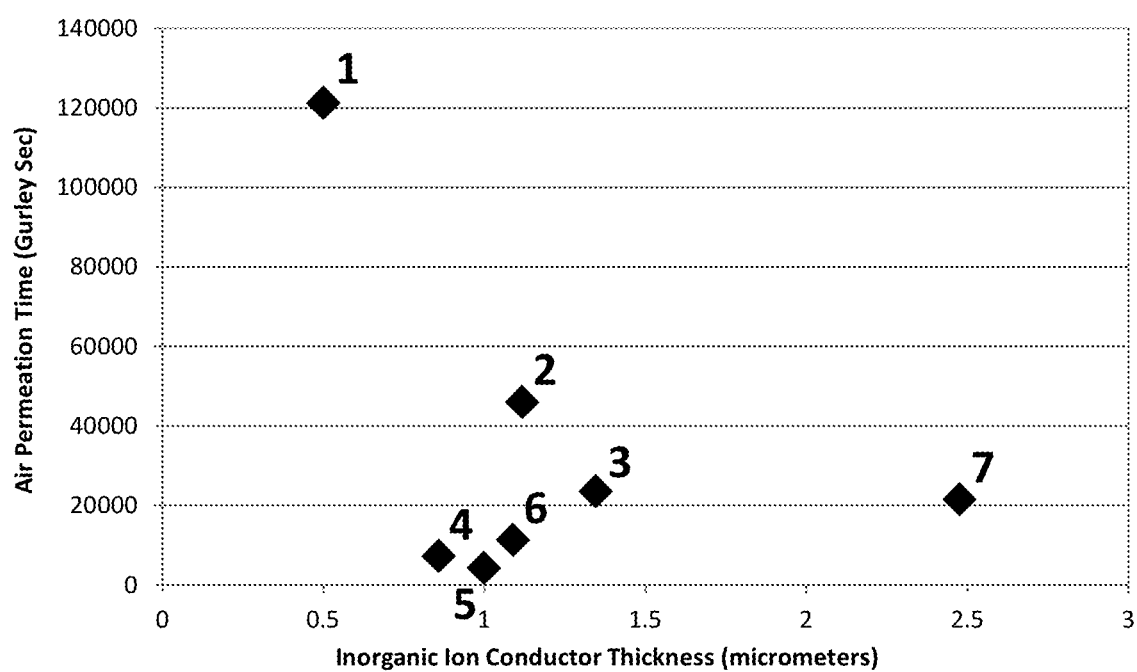
FIG. 5 is a plot of air permeation time versus inorganic ion conductor thickness for various inorganic ion conductor-separator composites.

FIG. 5 is a graph showing air permeation time versus ion conductor layer thickness for composites including plasma treated and untreated separators. The figure highlights the improvement in air permeation times with plasma treatment of the separator before applying the lithium oxysulfide coating, i.e., samples 1, 2, 3, and 6, compared to composites that included separators that were untreated before the addition of the lithium oxysulfide layer (samples 4, 5, and 7).

This example demonstrates that air permeation time generally increases when the surface of the separator of the is subjected to plasma treatment prior to deposition of the oxysulfide layer, which promotes sufficient bonding between the oxysulfide layer and the separator. The absence of plasma treatment resulted in delamination of the oxysulfide layer, and therefore leads to poorer barrier properties. This example also shows that the highest air permeation time (and, therefore, enhanced barrier properties) was achieved with a lithium oxysulfide layer having a thickness of 0.5 microns (sample 1). This data suggests that thinner lithium oxysulfide layers generally lead to improved barrier properties compared to composites having thicker lithium oxysulfide layers, with the combination of a thin lithium oxysulfide layer and a plasma treated separator showing the highest air permeation time (and, therefore, enhanced barrier properties).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
a first electrode comprising lithium as an electroactive material;
a second electrode; and
a composite positioned between the first and second electrodes, the composite comprising:
a separator comprising pores having an average pore size, wherein the separator has a bulk electronic resistivity of at least about $10^4$ Ohm-meters; and
an ion conductor layer bonded to the separator,
wherein the separator and the ion conductor layer have a strength of adhesion that passes a tape test according to standard ASTM D3359-02,
wherein the ion conductor layer has a lithium-ion conductivity of at least $10^{-6}$ S/cm and less than 20 S/cm,
wherein the ion conductor layer comprises a lithium oxysulfide, and
wherein a root mean square surface roughness of the ion conductor layer is between 0.5 nm and 1 micron.

2. An electrochemical cell of claim 1, wherein the ion conductor layer comprises a lithium oxysulfide having an atomic ratio of oxygen atoms to sulfur atoms (O:S) in the range of from 0.01:1 to 0.25:1.

3. An electrochemical cell of claim 1, wherein the ion conductor layer comprising the lithium oxysulfide is a part of a multi-layered structure comprising more than one ion conductor layers.

4. An electrochemical cell of claim 1, wherein the ion conductor layer comprising the lithium oxysulfide is in direct contact with each of the first electrode and the separator.

5. An electrochemical cell of claim 1, wherein the separator has a thickness between 5 microns and 40 microns.

6. An electrochemical cell of claim 1, wherein the separator has a bulk electronic resistivity between $10^{10}$ Ohm meters and $10^{15}$ Ohm meters.

7. An electrochemical cell of claim 1, wherein the separator is a solid, polymeric separator.

8. An electrochemical cell of claim 1, wherein the separator is a solid comprising a mixture of a polymeric binder and a filler comprising a ceramic or a glassy/ceramic material.

9. An electrochemical cell of claim 1, wherein the separator comprises one or more of poly(n-pentene-2), polypropylene, polytetrafluoroethylene, a polyamide (e.g., polyamide (Nylon), poly(ε-caprolactam) (Nylon 6), poly(hexamethylene adipamide) (Nylon 66)), a polyimide (e.g., polynitrile, and poly(pyromellitimide-1,4-diphenyl ether) (Kapton®) (NOMEX®) (KEVLAR®)), polyether ether ketone (PEEK), and combinations thereof.

10. An electrochemical cell of claim 1, wherein the lithium oxysulfide has a formula of $x(yLi_2S+zLi_2O)+MS_2$ (where M is Si, Ge, or Sn), where y+z=1, and where x may range from 0.5-3.

11. An electrochemical cell of claim 1, wherein the ion conductor layer comprises a glass-forming additive ranging from 0 wt % to 30 wt % of the inorganic ion conductor material.

12. An electrochemical cell of claim 1, wherein the separator has an average pore size of less than or equal to 0.5 microns.

13. An electrochemical cell of claim 1, wherein the ion conductor layer has a thickness of less than or equal to 800 nm.

14. An electrochemical cell of claim 1, wherein the composite has a lithium ion conductivity of at least $10^{-5}$ S/cm at 25 degrees Celsius.

15. An electrochemical cell of claim 1, wherein a ratio of a thickness of the ion conductor layer to the average pore size of the separator is at least 1.1:1 and less than or equal to 20:1.

16. An electrochemical cell of claim 1, wherein a strength of adhesion between the separator and the ion conductor layer is at least 50 N/m and less than or equal to 2000 N/m.

17. The electrochemical cell of claim 1, wherein the ion conductor layer serves as a solvent barrier.

18. The electrochemical cell of claim 1, wherein the tape test comprises forming an X-cut through the separator.

19. The electrochemical cell of claim 1, wherein the strength of adhesion between the separator and the ion conductor layer is such that, when ASTM D3359-02 is performed, the separator does not delaminate from ion conductor layer.

20. An electrochemical cell, comprising:
a first electrode comprising lithium as an electroactive material;
a second electrode; and
a composite positioned between the first and second electrodes, the composite comprising:
a separator comprising pores having an average pore size, wherein the separator has a bulk electronic resistivity of at least about $10^4$ Ohm-meters; and
an ion conductor layer bonded to the separator,
wherein the separator and the ion conductor layer have a strength of adhesion that passes a tape test according to standard ASTM D3359-02,
wherein the ion conductor layer has a lithium-ion conductivity of at least $10^{-6}$ S/cm and less than 20 S/cm,
wherein the ion conductor layer comprises a lithium oxysulfide, and
wherein the ion conductor layer comprises a lithium oxysulfide having an atomic ratio of oxygen atoms to sulfur atoms (O:S) in the range of from 0.01:1 to 0.25:1.

21. An electrochemical cell, comprising:
a first electrode comprising lithium as an electroactive material;
a second electrode; and
a composite positioned between the first and second electrodes, the composite comprising:
a separator comprising pores having an average pore size, wherein the separator has a bulk electronic resistivity of at least about $10^4$ Ohm-meters; and an ion conductor layer bonded to the separator, wherein the separator and the ion conductor layer have a strength of adhesion that passes a tape test according to standard ASTM D3359-02, wherein the ion conductor layer has a lithium-ion conductivity of at least $10^{-6}$ S/cm and less than 20 S/cm, wherein the ion conductor layer comprises a lithium oxysulfide, and wherein the lithium oxysulfide has a formula of $x(yLi_2S+zLi_2O)+MS_2$ (where M is Si, Ge, or Sn), where y+z=1, and where x may range from 0.5-3.

* * * * *